United States Patent [19]
Watanabe

[11] Patent Number: 6,069,658
[45] Date of Patent: May 30, 2000

[54] SOLID-STATE IMAGING DEVICE AND METHOD FOR DRIVING THE SAME

[75] Inventor: Takashi Watanabe, Soraku-gun, Japan

[73] Assignee: Sharp Kabushiki Kaisha, Osaka, Japan

[21] Appl. No.: 08/822,887

[22] Filed: Mar. 24, 1997

[30] Foreign Application Priority Data

Mar. 25, 1996 [JP] Japan .................................. 8-068834
Apr. 14, 1997 [JP] Japan .................................. 9-005109

[51] Int. Cl.⁷ .................................................. H04N 3/14
[52] U.S. Cl. .......................................... 348/316; 348/294
[58] Field of Search .................................... 348/294, 295, 348/297, 298, 311, 317, 322, 324, 296, 316; 257/232; 250/208.1

[56] References Cited

U.S. PATENT DOCUMENTS

| | | | |
|---|---|---|---|
| 4,245,252 | 1/1981 | Nagumo | 348/294 |
| 4,604,652 | 8/1986 | Elabd et al. | 257/231 |
| 4,675,887 | 6/1987 | Akiyama et al. | 257/233 |
| 4,860,326 | 8/1989 | Mutoh | 248/296 |
| 5,396,121 | 3/1995 | Watanabe . | |
| 5,825,840 | 10/1998 | Anagnostopoulos | 257/232 |
| 5,926,215 | 7/1999 | Whipple et al. | 348/322 |

OTHER PUBLICATIONS

N. Harada, et al., Japanese Technical Report of Television Society, pp. 21–26 (1978).
A.J.P. Theuwissen, et al., "The Accordion Imager: An Ultra High Density Frame Transfer CCD", IEDM, pp. 40–43 (1984).

*Primary Examiner*—Tuan Ho
*Assistant Examiner*—Aung S. Moe
*Attorney, Agent, or Firm*—Dike, Bronstein, Roberts & Cushman, LLP; David G. Conlin

[57] ABSTRACT

A solid-state image device includes a pixel portion with n pixels arranged a first direction and a first and second charge transfer portions substantially orthogonally to each other. Further, the solid-state image device having a driving circuit for driving the first charge transfer portion, wherein the driving circuit drives the first charge transfer portion so as to (1) read a signal from an i-th pixel counted from the side of the second charge transfer portion among the n pixels arranged in the pixel portion to a j-th bit portion of the first charge transfer portion, (2) transfer the read signal in the first direction by $(k-1)/k$ bits, (3) define $i=i+1$, and (4) repeat the steps (1) through (3) from a first pixel closest to the second charge transfer portion to a pixel farthest from the second charge transfer portion among the pixels arranged in the pixel portion, where k is an integer of 2 or more, and $j=\text{INT}[\{(I-1)/k\}+1]$ (where INT[ ] is an integer portion of[ ] (a fractional portion is discarded)).

17 Claims, 16 Drawing Sheets

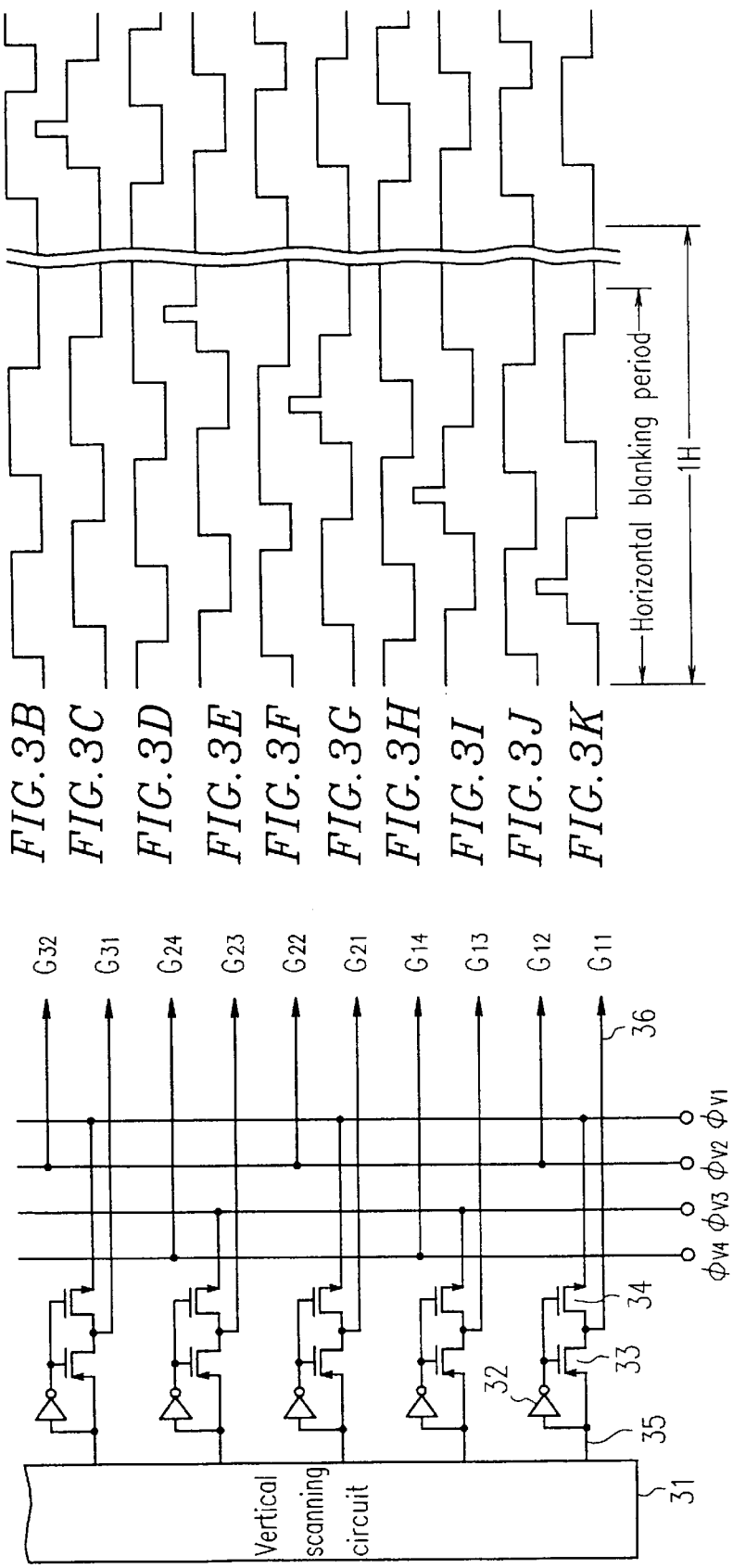

FIG.4D    HCCD readout

FIG.4G    HCCD readout

FIG.4J    HCCD readout

FIG.4M    HCCD readout

In the case of k=2, m=3

In the case of k=2, m=5

In the case of k=2, m=2

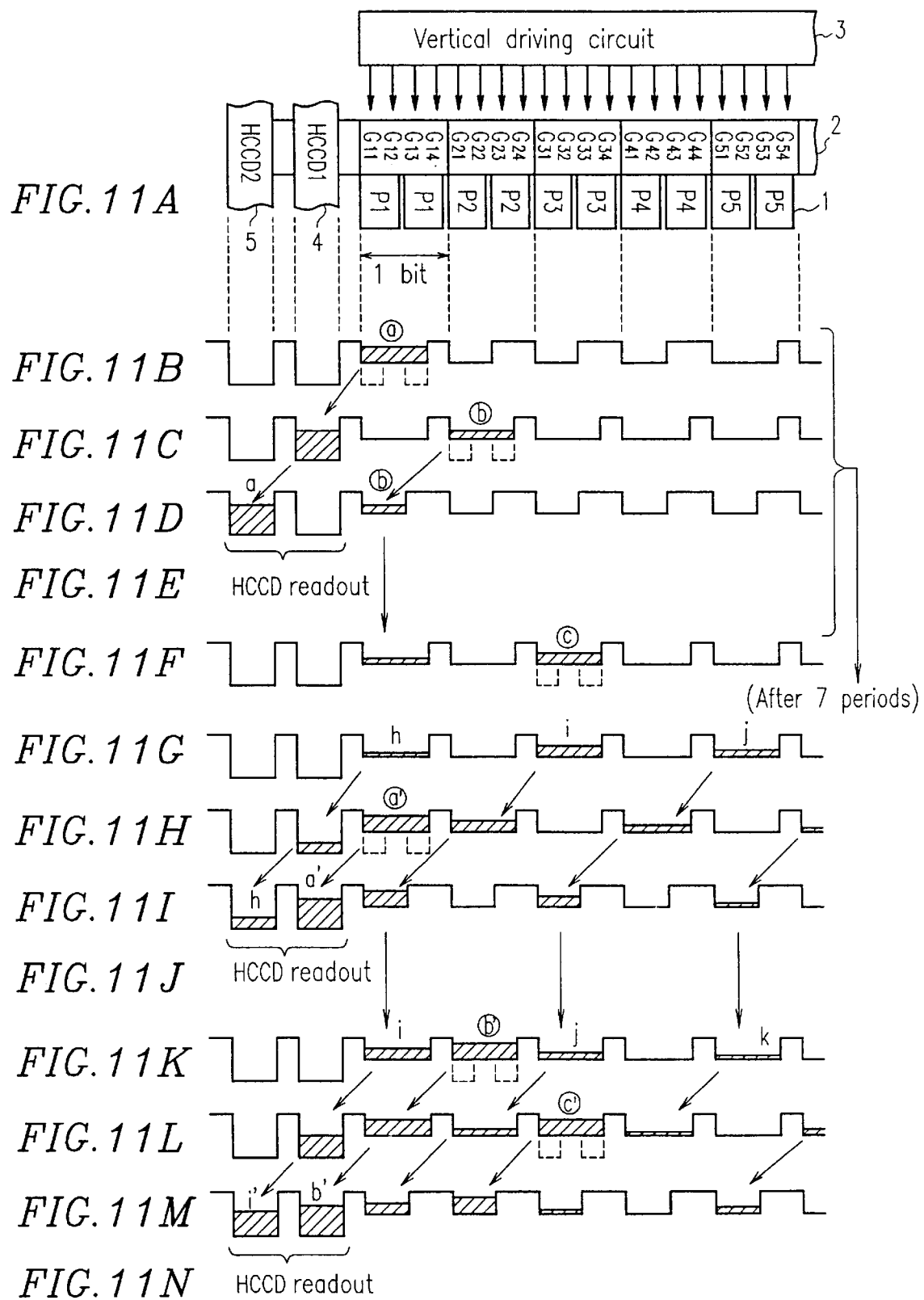

PRIOR ART

PRIOR ART

SOLID-STATE IMAGING DEVICE AND METHOD FOR DRIVING THE SAME

BACKGROUND OF THE INVENTION

1. Field of the Invention

The present invention relates to a solid-state imaging device, and more specifically to a charge transfer type solid-state imaging device which is capable of increasing the pixel density per bit of a charge transfer portion by k times (k is an integer of 2 or more).

2. Description of the Related Art

Various types of two-dimensional solid-state imaging devices are known. Among them, a charge-coupled device (CCD) type solid-state imaging device has an advantage that it generates less noise. In general, the CCD type solid-state imaging device is classified into two groups: one group relates to an interline transfer system, and the other group relates to a frame transfer system. At the present time, the CCD type solid-state imaging device of the interline transfer system is most commonly used. This is because such a CCD type solid-state imaging device is highly sensitive to short wavelengths due to the use of a photodiode as a photoelectric conversion element and it generates less false signals, called "smears", due to the separately provided light-receiving portion and transfer portion.

FIG. 14A is a schematic plan view showing a structure of a conventional CCD type solid-state imaging device of an interline transfer system; FIGS. 14B through 14K show charge transfer timing. Such a CCD type solid-state imaging device includes a plurality of photosensitive elements (pixels) 1 for converting light into electric charge and accumulating the electric charge. The plurality of pixels 1 are arranged in an array of rows and columns along a first direction (hereinafter, referred to as a vertical direction) and a second direction (hereinafter, referred to as a horizontal direction) which is substantially perpendicular to the first direction. The CCD type solid-state imaging device further includes vertical charge transfer portions 2 each disposed on the adjacent side of each column of the pixels 1 for vertically transferring signals read from the pixels 1, a horizontal charge transfer portion 4 connected to the end of each of the vertical charge transfer portions 2 for horizontally transferring the signals supplied from the vertical charge transfer portions 2, and an output portion 7 disposed at one end of the horizontal charge transfer portion 4 for converting the signals supplied from the horizontal charge transfer portion 4 into image signals to output them to an external device (not shown).

Each of the vertical charge transfer portions 2 has a four-phase structure. Specifically, each of the vertical charge transfer portions 2 is driven by four-phase driving signals $\phi_{V1}$, $\phi_{V2}$, $\phi_{V3}$, and $\phi_{V4}$. A pair of pixels which are adjacent to each other in the vertical direction correspond to 1 bit of each of the vertical charge transfer portions 2. For example, pixels P1 and P2, P3 and P4 correspond to 1 bit thereof, respectively.

A CCD charge transfer portion can transfer only one pixel signal per bit. Therefore, as shown in FIGS. 14B through 14K, the conventional CCD type solid-state imaging device effects field accumulation and interlaced reading. Specifically, in a first (odd-number) field, signals output from the pixels P1 and P2, P3 and P4, etc. which are adjacent to each other in the vertical direction are read and added to each other to form one pixel signal. Then, the pixel signal thus obtained is transferred in the vertical direction, followed by the horizontal direction, thereby obtaining an output signal. In a second (even-number) field, signals output from the pixels P2 and P3, P4 and P5, etc. which are adjacent to each other in the vertical direction are read and added to each other to form one pixel signal. Then, the pixel signal thus obtained is transferred in the vertical direction, followed by the horizontal direction, thereby obtaining an output signal.

However, in the above-mentioned operation, a signal for one screen involves 2 fields. Therefore, with a moving subject, its image is likely to be blurred between the fields. Furthermore, since signals output from two pixels are added to each other in the vertical direction, vertical resolution of even a stationary image may be degraded.

As a CCD type solid-state imaging device which is capable of solving the above-mentioned problems, there is a progressive scan type CCD in which all the pixel signals are read in one field without being mixed. FIG. 15A is a schematic plan view showing a structure of a conventional progressive scan type CCD; FIGS. 15B through 15E show charge transfer timing. In FIG. 15A, the components identical with those in FIG. 14A are denoted with the reference numerals identical therewith.

As is apparent from the comparison between FIGS. 14A through 14K and 15A through 15E, one bit of a vertical charge transfer portion corresponds to one pixel in the progressive scan type CCD shown in FIG. 15A, while one bit of the vertical charge transfer portion corresponds to two pixels in the CCD type solid-state imaging device shown in FIG. 14A. In the case of the progressive scan type CCD shown in FIG. 15A, it is required to lead out electrodes of vertical charge transfer portions 2 between the pixels. Therefore, each of the vertical charge transfer portions 2 has a three-phase structure (if it is a four-phase structure, four electrodes are required, resulting in the difficulty in processing) and is driven by three-phase driving signals $\phi_{V1}$, $\phi_{V2}$, and $\phi_{V3}$.

As shown in FIG. 15B, all the pixel signals are read without being mixed in the vertical charge transfer portion 2. Since one bit of the CCD transfer portion corresponds to one pixel, all the pixel signals can be successively read in accordance with an ordinary transfer operation, as shown in FIGS. 15C through 15E. Thus, a progressive scan operation is conducted. Because of this, in the progressive scan type CCD, the image of a moving subject is not blurred, and the vertical resolution of a stationary image is not degraded.

However, in the progressive scan type CCD, the maximum charge handling capacity which the vertical charge transfer portion 2 can handle is limited to the capacity available for one electrode of the three-phase electrodes. More specifically, signal charge can be accumulated only in one electrode of the three electrodes. Therefore, even in the satisfactory case where each electrode becomes equal, the area for charge accumulation of each of the vertical charge transfer portions 2 becomes ⅓ of a pixel pitch in the transfer direction. In the case of the CCD type solid-state imaging device shown in FIG. 14A, a charge amount corresponding to the same length as that of a pixel pitch can be accumulated. As a result, the maximum charge handling capacity handled by the vertical charge transfer portion 2 of the progressive scan type CCD decreases to ⅓ of that of the CCD type solid-state imaging device shown in FIG. 14A.

The decrease in charge handling capacity results in the decrease in the maximum signal amount of an imaging device, i.e., the decrease in dynamic range. When the dynamic range of the imaging device is low, the higher side of the light amount to be handled is narrowed. Thus, a flat image without any depth is obtained, with a bright portion of the image being white. In general, a clear image with a good S/N ratio can be obtained with a brighter scene. However, when the dynamic range is low, a bright scene becomes white; consequently, an image with a good S/N ratio cannot be obtained.

In order to solve the above-mentioned problems involved in the progressive scan type CCD, another CCD type solid-state imaging device is described in A. J. P. Theuwissen et al., "The Accordion Imager: an Ultra High Density Frame Transfer CCD", IEDM Technical Digest, pp. 40–43, December 1984.

FIG. 16A is a schematic plan view showing a structure of a CCD type solid-state imaging device; FIGS. 16B through 16N show charge transfer timing. In FIG. 16A, the components identical with those in FIG. 14A are denoted with the reference numerals identical therewith. The CCD type solid-state imaging device shown in FIG. 16A is different from that shown in FIG. 14A in that each vertical charge transfer portion 2 is driven by a vertical driving circuit 30 on an electrode basis.

The operation of the vertical driving circuit 30 will be described with reference to the charge transfer timing shown in FIGS. 16B through 16N. As shown in FIG. 16B, all the pixel signals are read without being mixed in the vertical charge transfer portion 2. A CCD transfer portion can read only one pixel signal per bit. Therefore, as shown in FIGS. 16B through 16N, electric charge is read successively from a pixel closest to a horizontal charge transfer portion 4, whereby a charge density is decreased to ½ and the electric charge is successively replaced for four-phase driving. After being replaced for four-phase driving, ordinary driving becomes possible. Thus, a progressive scan operation in which all the pixel signals are successively read in one field can be conducted. This operation is called an "accordion operation".

However, the CCD type solid-state imaging device shown in FIG. 16A has the following problems.

(1) A signal is read from one pixel, and then, temporarily accumulated in one electrode. Therefore, the maximum signal amount handled by each of the vertical charge transfer portions 2 decrease to ½ of that of the CCD type solid-state imaging device shown in FIG. 15A.

(2) A signal read from a pixel portion, which is farther from the horizontal charge transfer portion 4, is stored in the vertical charge transfer portion 2 in a stationary state for a longer period of time. Therefore, a larger amount of noise charge caused by the dark current generated in the vertical charge transfer portion 2 is added to the pixel portion which is farther from the horizontal charge transfer portion 4. The noise charge becomes a fixed pattern noise, remarkably degrading an image quality.

SUMMARY OF THE INVENTION

A solid-state imaging device according to the present invention includes: a pixel portion including n pixels arranged in a first direction, converting incident light into electric charge and accumulating generated signal charge; a first charge transfer portion connected to the pixel portion, transferring a signal read from each of the pixels of the pixel portion in the first direction, k pixels corresponding to one bit; a second charge transfer portion connected to one end of the first charge transfer portion, receiving the signal transferred by the first charge transfer portion and transferring the received signal in a second direction substantially orthogonal to the first direction; an output circuit connected to one end of the second charge transfer portion, receiving the signal transferred by the second charge transfer portion and converting the received signal into an image signal to output it to an external device; and a driving circuit for driving the first charge transfer portion. The driving circuit drives the first charge transfer portion so as to (1) read a signal from an i-th pixel counted from the side of the second charge transfer portion among the n pixels arranged in the pixel portion to a j-th bit portion of the first charge transfer portion, (2) transfer the read signal in the first direction by (k−1)/k bits, (3) define i=i+1, and (4) repeat the steps (1) through (3) from a first pixel closest to the second charge transfer portion to a pixel farthest from the second charge transfer portion among the pixels arranged in the pixel portion, where k is an integer of 2 or more, and j=INT[{(i−1)/k}+1] (INT[ ] is an integer portion of [ ] (a fractional portion is discarded).

In one embodiment of the present invention, after an n-th pixel farthest from the second charge transfer portion is read, the driving circuit conducts an operation of a step (5) of generating a plurality of driving signals in such a manner as to allow the first charge transfer portion to perform only a transfer operation.

In another embodiment of the present invention, the second charge transfer portion has q charge transfer channels, where q is an integer of 1 or more.

In another embodiment of the present invention, the first charge transfer portion has an m-phase driving structure, and the driving circuit includes a scanning circuit for successively providing a pulse for reading the signal to the first charge transfer portion and a clock supply circuit for supplying an m-phase clock for transfer of the signal to the first charge transfer portion, where m is an integer of 2 or more.

In another embodiment of the present invention, the steps (1) through (3) are repeated p=q·k/(k−1) times during a horizontal blanking period of an image signal, and a signal is read from the second charge transfer portion composed of q channels during a horizontal scanning period, and, in the case where p is not an integer, p is determined by a combination of INT[p] and INT[p+1].

In another embodiment of the present invention, a third charge transfer portion having n/k bits or more in the first direction is provided between the first charge transfer portion and the second charge transfer portion, and the third charge transfer portion works as a memory portion.

In another embodiment of the present invention, the third charge transfer portion has the same phase-number driving structure as the first charge transfer portion, and the driving circuit drives the first charge transfer portion and the third charge transfer portion so as to synchronize the first charge transfer portion with the third charge transfer portion during charge transfer in the first direction.

In another embodiment of the present invention, the steps (1) through (4) are conducted during a vertical blanking period of an image signal, and the step (5) is conducted during a signal readout period.

In another embodiment of the present invention, after the steps (1) through (4) are conducted, the steps (1) through (4) are conducted again during the step (5) and after signal charge in the first charge transfer portion is transferred to the third charge transfer portion, the step (5) is conducted again, and an effective exposure period of a signal output during the step (5) is arbitrarily set.

Alternatively, a solid-state imaging device according to the present invention includes: a pixel portion including n pixels arranged in a first direction, converting incident light into electric charge and accumulating generated signal charge; a first charge transfer portion connected to the pixel portion, transferring a signal read from each of the pixels of the pixel portion in the first direction, k pixels corresponding to one bit; a second charge transfer portion connected to one end of the first charge transfer portion, receiving the signal transferred by the first charge transfer portion and transferring the received signal in a second direction substantially orthogonal to the first direction; an output circuit connected to one end of the second charge transfer portion, receiving the signal transferred by the second charge transfer portion and converting the received signal into an image signal to output it to an external device; and a driving circuit for driving the first charge transfer portion. The driving circuit drives the first charge transfer portion so as to (1) read signals from an i-th pixel and an (i+1)-th pixel counted from the side of the second charge transfer portion among the n pixels arranged in the pixel portion to a j-th bit portion of the first charge transfer portion in such a manner that the signals are added to each other, (2) transfer the read signal in the first direction by 2(k−1)/k bits, (3) define i=i+2, (4) repeat the steps (1) through (3) from a first pixel closest to the second charge transfer portion to a pixel farthest from the second charge transfer portion among the pixels arranged in the pixel portion, and (5), after time $t_a$ when the steps (1) through (3) are repeated up to a 2(2r+1)-th pixel in the middle of the step (4), repeat the steps (1) through (3) from a first pixel closest to the second charge transfer portion to a pixel farthest from the second charge transfer portion among the pixels arranged in the pixel portion, wherein the steps (4) and (5) are simultaneously conducted after the time $t_a$, where k is an integer of 2 or more, r is an integer of 1 or more, and j=INT[{(i−1)/k}+1] (INT[ ] is an integer portion of [ ] (a fractional portion is discarded).

In one embodiment of the present invention, after an n-th pixel farthest from the second charge transfer portion is read during the step (5), the driving circuit conducts an operation of a step (6) of generating a plurality of driving signals in such a manner as to allow the first charge transfer portion to perform only a transfer operation.

In another embodiment of the present invention, the second charge transfer portion has q charge transfer channels, where q is an integer of 1 or more.

In another embodiment of the present invention, the first charge transfer portion has an m-phase driving structure, and the driving circuit includes a scanning circuit for successively providing a pulse for reading the signal to the first charge transfer portion and a clock supply circuit for supplying an m-phase clock for transfer to the first charge transfer portion, where m is an integer of 2 or more.

In another embodiment of the present invention, the steps (1) through (3) are repeated p=q·k/[(k−1)·2] times during a horizontal blanking period of an image signal, and a signal is read from the second charge transfer portion composed of q channels during a horizontal scanning period, and, in the case where p is not an integer, p is determined by a combination of INT[p] and INT[p+1].

In another embodiment of the present invention, assuming that a signal obtained during the step (4) is a first signal and a signal obtained during the step (5) is a second signal, the first signal is passed through a delay circuit delaying a signal by rH (H is one horizontal scanning period), the first signal and the second signal are passed through two white clipping circuits regulating a white level to a predetermined value equal to or less than a light amount of a saturated signal, and the first signal and the second signal from the two white clipping circuits are added to each other.

According to another aspect of the present invention, a method for driving a solid-state imaging device is provided. The device includes: a pixel portion including n pixels arranged in a first direction, converting incident light into electric charge and accumulating generated signal charge; a first charge transfer portion connected to the pixel portion, transferring a signal read from each of the pixels of the pixel portion in the first direction, k pixels corresponding to one bit; a second charge transfer portion connected to one end of the first charge transfer portion, receiving the signal transferred by the first charge transfer portion and transferring the received signal in a second direction substantially orthogonal to the first direction; an output circuit connected to one end of the second charge transfer portion, receiving the signal transferred by the second charge transfer portion and converting the received signal into an image signal to output it to an external device; and a driving circuit for driving the first charge transfer portion. The method includes the steps of: (1) reading a signal from an i-th pixel counted from the side of the second charge transfer portion among the n pixels arranged in the pixel portion to a j-th bit portion of the first charge transfer portion, (2) transferring the read signal in the first direction by (k−1)/k bits, (3) defining i=i+1, and (4) repeating the steps (1) through (3) from a first pixel closest to the second charge transfer portion to a pixel farthest from the second charge transfer portion among the pixels arranged in the pixel portion, where k is an integer of 2 or more, and j=INT[{(i−1)/k}+1] (INT[ ] is an integer portion of [ ] (a fractional portion is discarded).

According to another aspect of the present invention, a method for driving a solid-state imaging device is provided. The device includes: a pixel portion including n pixels arranged in a first direction, converting incident light into electric charge and accumulating generated signal charge; a first charge transfer portion connected to the pixel portion, transferring a signal read from each of the pixels of the pixel portion in the first direction, k pixels corresponding to one bit; a second charge transfer portion connected to one end of the first charge transfer portion, receiving the signal transferred by the first charge transfer portion and transferring the received signal in a second direction substantially orthogonal to the first direction; an output circuit connected to one end of the second charge transfer portion, receiving the signal transferred by the second charge transfer portion and converting the received signal into an image signal to output it to an external device; and a driving circuit for driving the first charge transfer portion. The method includes the steps of: (1) reading signals from an i-th pixel and an (i+1)-th pixel counted from the side of the second charge transfer portion among the n pixels arranged in the pixel portion to a j-th bit portion of the first charge transfer portion in such a manner that the signals are added to each other, (2) transferring the read signal in the first direction by 2(k−1)/k bits, (3) defining i=i+2, (4) repeating the steps (1) through (3) from a first pixel closest to the second charge transfer portion to a pixel farthest from the second charge transfer portion among the pixels arranged in the pixel portion, and (5), after time $t_a$ when the steps (1) through (3) are repeated up to an r-th pixel in the middle of the step (4), repeating the steps (1) through (3) from a first pixel closest to the second charge transfer portion to a pixel farthest from the second charge transfer portion among the pixels arranged in the pixel portion, wherein the steps (4) and (5) are simultaneously conducted after the time $t_a$, where k is an integer of 2 or more, r is an integer of 1 or more, and j=INT[{(i−1)/k}+1] (INT[ ] is an integer portion of [ ] (a fractional portion is discarded).

The function of the present invention will be described below.

According to the present invention, every time a pixel signal is transferred by (k−1)/k bits by the vertical charge transfer portion (first charge transfer means), a pixel signal of one pixel is successively read from a pixel portion to the vertical charge transfer portion in the order from the side closest to the horizontal charge transfer portion (second charge transfer means). Therefore, even when k pixels correspond to one bit of the vertical charge transfer portion, all the pixel signals can be read successively. Thus, the pixel density can be increased by k times, compared with the conventional examples, under the condition that one pixel signal is handled per bit of the vertical charge transfer portion.

As a result, one bit of the vertical charge transfer portion corresponds to the length which is k times a pixel pitch, so that a large charge handling capacity can be obtained. This overcomes the problems involved in the conventional progressive scan type CCD during the progressive scan operation.

Furthermore, in the above-mentioned structure, merely by altering the driving system of a driving portion providing a clock for transfer to the vertical charge transfer portion, a progressive scan operation with a large charge handling capacity can be realized without altering the structures of the pixel portion and the vertical charge transfer portion. Specifically, it is not required to substantially alter the structure of the conventional progressive scan type CCD; therefore, the CCD as described above can be easily produced.

Furthermore, since k pixels correspond to one bit of the vertical charge transfer portion, the pixel density of the vertical charge transfer portion can be relaxed to 1/k. This enables an imaging device to have more pixels and to be miniaturized. High performance such as high sensitivity, a wide dynamic range, etc. can be obtained.

According to the structure in which the vertical charge transfer portion performs a q bit transfer operation per horizontal scanning period, the transfer operation is periodically performed in a continuous manner. Thus, a signal is not likely to be stored in a stationary state for a long time. Specifically, a signal read from a pixel portion farther from the horizontal charge transfer portion is not likely to be stored in a stationary state for a longer period of time, and a dark current is equally divided in each of the vertical charge transfer portions. Therefore, a fixed pattern noise does not occur.

Furthermore, the driving means drives the first charge transfer means so as to (1) read signals from an i-th pixel and an (i+1)-th pixel counted from the side of the second charge transfer means among the n pixels arranged in the pixel portion to a j-th bit portion of the first charge transfer means in such a manner that the signals are added to each other, (2) transfer the read signal in the first direction by 2(k−1)/k bits, (3) define i=i+2, (4) repeat the steps (1) through (3) from a first pixel closest to the second charge transfer means to a pixel farthest from the second charge transfer means among the pixels arranged in the pixel portion, and (5), after time $t_a$ when the steps (1) through (3) are repeated up to an r-th pixel in the middle of the step (4), repeat the steps (1) through (3) from a first pixel closest to the second charge transfer means to a pixel farthest from the second charge transfer means among the pixels arranged in the pixel portion. Herein, the steps (4) and (5) are simultaneously conducted after the time $t_a$. In this structure, a wide dynamic range can be obtained.

According to the above-mentioned structure, a subject is imaged on an entire screen without being blurred even in the case where very strong light such as back-light is present in the subject. The reason why a wide dynamic range is obtained in the above-mentioned structure will be described in detail in Example 6 described later.

Thus, the invention described herein makes possible the advantages of (1) providing a small-sized solid-state imaging device in which the pixel density per bit of a charge transfer portion can be increased by k times (k is an integer of 2 or more) and pixels for progressive scanning are easily constructed, and which has high sensitivity and a wide dynamic range; (2) providing a solid-state imaging device with a wide dynamic range, in which a subject is imaged on an entire screen without being blurred even in the case where very strong light such as back-light is present in the subject; (3) providing a solid-state imaging device with ease of use in which various options can be selected with slight alterations in design; and (4) providing a solid-state imaging device with ease of use in which various options can be selected merely by altering a part of a driving circuit portion without substantial increase in cost.

These and other advantages of the present invention will become apparent to those skilled in the art upon reading and understanding the following detailed description with reference to the accompanying figures.

BRIEF DESCRIPTION OF THE DRAWINGS

FIGS. 3A through 3K schematically show a circuit configuration of a vertical driving circuit shown in FIG. 1A together with waveforms.

FIGS. 4B through 4M show charge transfer timing.

FIG. 11A is a schematic plan view showing a structure of a solid-state imaging device of Example 6 according to the present invention;

FIGS. 11B through 11N show charge transfer timing.

FIGS. 14B through 14K show charge transfer timing.

DESCRIPTION OF THE PREFERRED EMBODIMENTS

Hereinafter, the present invention will be described by way of illustrative examples with reference to the drawings.

EXAMPLE 1

Figure 1:
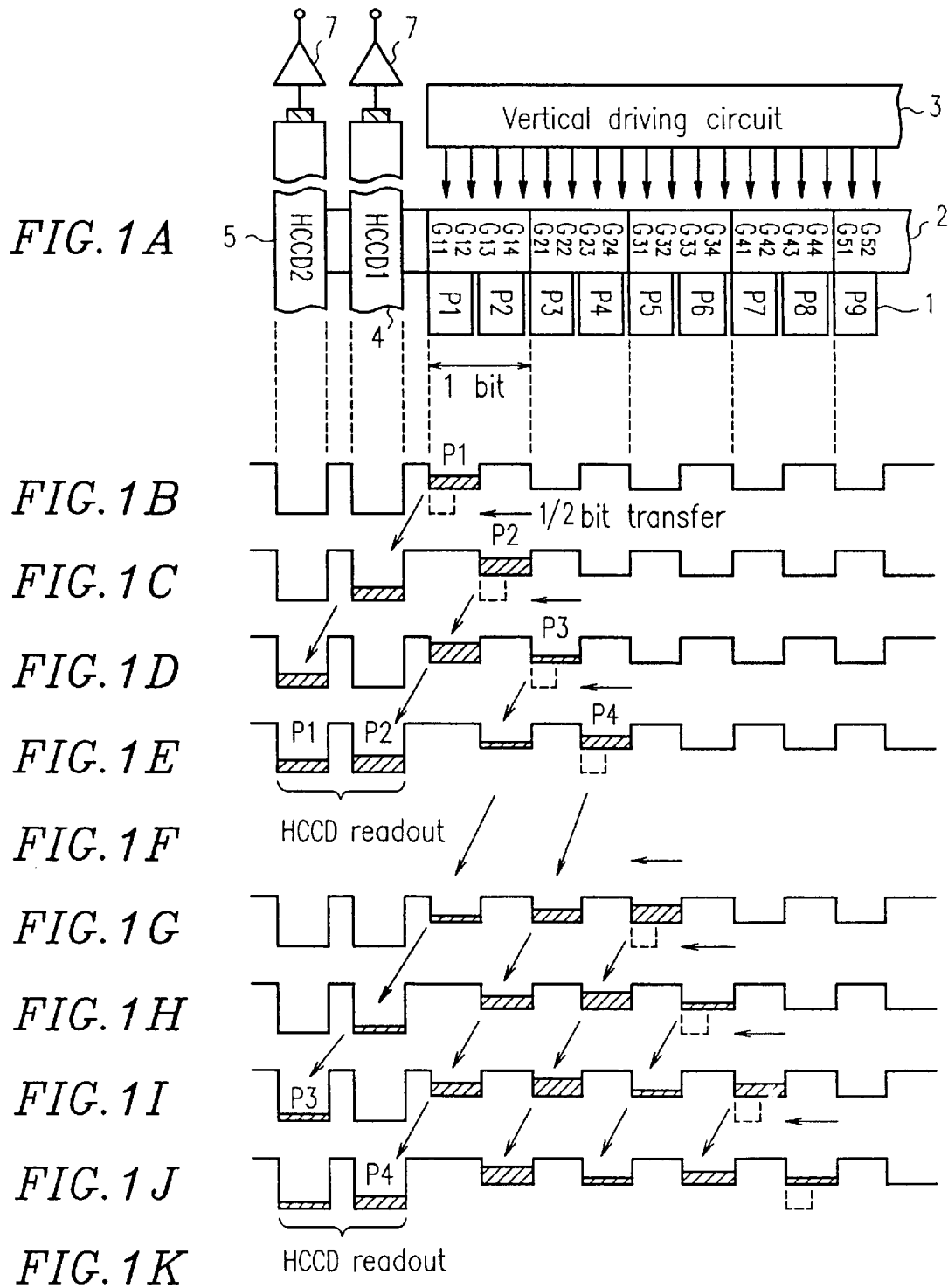
FIG. 1A is a schematic plan view showing a structure of a solid-state imaging device of Example 1 according to the present invention.
FIGS. 1B through 1K show charge transfer timing.

FIG. 1A is a schematic plan view showing a structure of a solid-state imaging device of Example 1; FIGS. 1B through 1K show charge transfer timing. The solid-state imaging device includes a plurality of pixels 1 for converting incident light into electric charge and accumulating the electric charge. The plurality of pixels 1 are arranged in an array of rows and columns along a vertical direction and a horizontal direction.

The solid-state imaging device further includes vertical charge transfer portions 2 each disposed on the adjacent side of each column of the pixels 1 for vertically transferring signals read from the pixels 1, a pair of horizontal charge transfer portions 4 and 5 connected to the end of each of the vertical charge transfer portions 2 for horizontally transferring the signals supplied from the vertical charge transfer portions 2, and output portions 7 disposed at one end of each of the horizontal charge transfer portions 4 and 5 for converting the signals supplied from the horizontal charge transfer portion 4 and 5 into image signals to output them to an external device (not shown). The vertical charge transfer portions 2 are driven by a vertical driving circuit 3 (described later).

In the solid-state imaging device of Example 1, two pixels correspond to one bit of each of the vertical charge transfer portions 2 (k=2). In Example 1, two-channel horizontal charge transfer portions 4 and 5 are provided (q=2). Hereinafter, the horizontal charge transfer portions 4 and 5 will be referred to as an "HCCD 1" and an "HCCD2", respectively.

Each of the vertical charge transfer portions 2 is driven by the vertical driving circuit 3 on an electrode basis. FIGS. 1B through 1K show driving timing, i.e., transfer timing of the vertical driving circuit 3. In the following description, the pixels 1 and the vertical charge transfer portions 2 are counted in the order from the side closest to the HCCD1. For example, the pixels 1 are denoted by pixels P1, P2, . . . , etc. from the side closest to the HCCD1.

Since a CCD transfer portion can read only one pixel signal per bit, as shown in FIG. 1B, a signal of the first pixel P1 is read to the first bit of the vertical transfer portion 2. As shown by a broken line in FIG. 1B, a vertical transfer gate (G11 in this case) at the corresponding pixel portion of the vertical transfer portion 2 becomes a high electric potential during a read operation.

Then, as shown in FIG. 1C, the vertical charge transfer portion 2 transfers a $(k-1)/k=(2-1)/2=\frac{1}{2}$ bit signal in the vertical direction, reads a signal of the second pixel P2 to the first bit of the vertical charge transfer portion 2, and transfers a ½ bit signal in the vertical direction. Here, a $(k-1)/k$ bit signal is transferred. The purpose for this is to successively read each pixel signal through a vertical transfer channel from the horizontal charge transfer portion side without posing any inbetween blank bit portion in the vertical transfer channel and to keep the operational relationship between the pixels 1 and the vertical charge transfer portions 2 to be the same at each time.

The vertical charge transfer portion 2 is considered to have a structure in which 1 bit analog memory elements are successively connected to each other. Therefore, "without posing any inbetween blank bit portion" refers to that image data is successively written in each memory element in a one-to-one relationship without any blanks, whereby data is written in every memory element.

During the operation shown in FIGS. 1B and 1C, the vertical charge transfer portion 2 transfers 1 bit data. Therefore, a signal of one pixel is accumulated in the HCCD1. In Example 1, the horizontal charge transfer portion have a two-channel structure, so that it is required for the vertical charge transfer portion 2 to transfer (q=2) bit data between one read operation of the horizontal charge transfer portion and another read operation. In Example 1, since q=2 and k=2, $q \div (k-1)/k = q \cdot k/(k-1) = 4$. More specifically, a 2 bit signal as a whole is transferred by conducting a ½ bit transfer four times. This operation is shown in FIGS. 1B through 1E.

Thus, during the operation shown in FIGS. 1B through 1E, pixel signals of 4 pixels (P1 through P4) are read and the signal charge is accumulated in the HCCD1 and HCCD2. Therefore, as shown in FIG. 1F, the pixel signals are transferred in the horizontal direction by the HCCD1 and HCCD2, whereby an output signal of 2 vertically adjacent pixels can be obtained.

The above-mentioned operation is repeated, and a signal of the i-th pixel Pi is read to the INT[{(i−1)/k}+1]-th bit of the vertical charge transfer portion 2 (where INT[ ] denotes an integer in [ ]), and is transferred in the vertical direction by (k−1)/k=½ bits. Then, this operation is repeated under the condition that i=i+1. In this manner, the HCCD1 and HCCD2 are driven every time the vertical charge transfer portion 2 transfers a 2 bit signal, whereby a pixel signal of vertically adjacent two pixels is obtained.

Figure 15A:
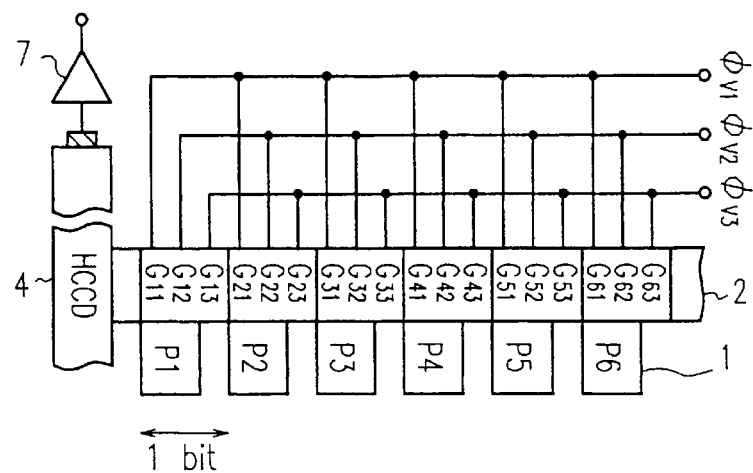
FIG. 15A is a schematic plan view showing a structure of another conventional solid-state imaging device.
Figure 15B:
FIGS. 15B through 15E show charge transfer timing.
Figure 15C:
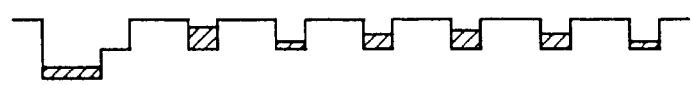
Figure 15D:
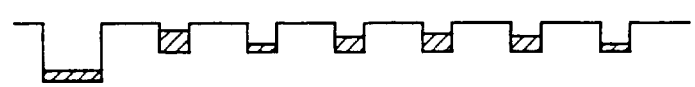
Figure 15E:
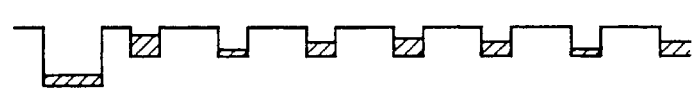

In the above-mentioned operation, signals of 2 pixels are read per bit of the vertical charge transfer portion 2 successively without being mixed. Irrespective of this fact, the signal amount corresponding to one bit can be handled by the vertical charge transfer portion 2. Thus, a large value can be obtained. Furthermore, the pixel density can be increased twice that of the conventional examples of FIG. 15A during the progressive scan operation.

Figures 16A, 16B, 16C, 16D, 16E, 16F, 16G, 16H, 16I, 16J, 16K, 16L, 16M, 16N:
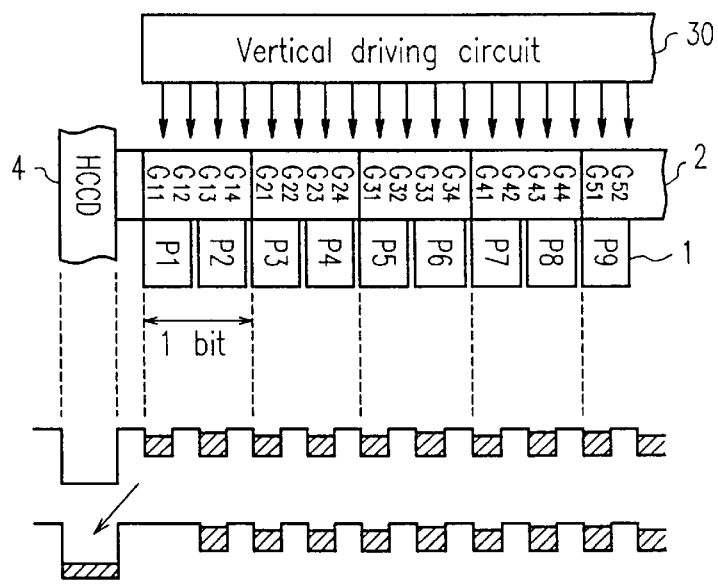
FIG. 16A is a schematic plan view showing a structure of still another conventional solid-state imaging device.
FIGS. 16B through 16N show charge transfer timing.

Furthermore, the vertical charge transfer portion 2 conducts the ½ bit transfer four times during a horizontal blanking period, and periodically operates all the time. Therefore, a dark current is equally divided in the vertical transfer portion. More specifically, the fixed pattern noise involved in the accordion type CCD as shown in FIG. 16A does not occur. Accordingly, the solid-state imaging device of Example 1 can overcome the problems of the solid-state imaging devices shown in FIGS. 15A and 16A.

Figure 2:
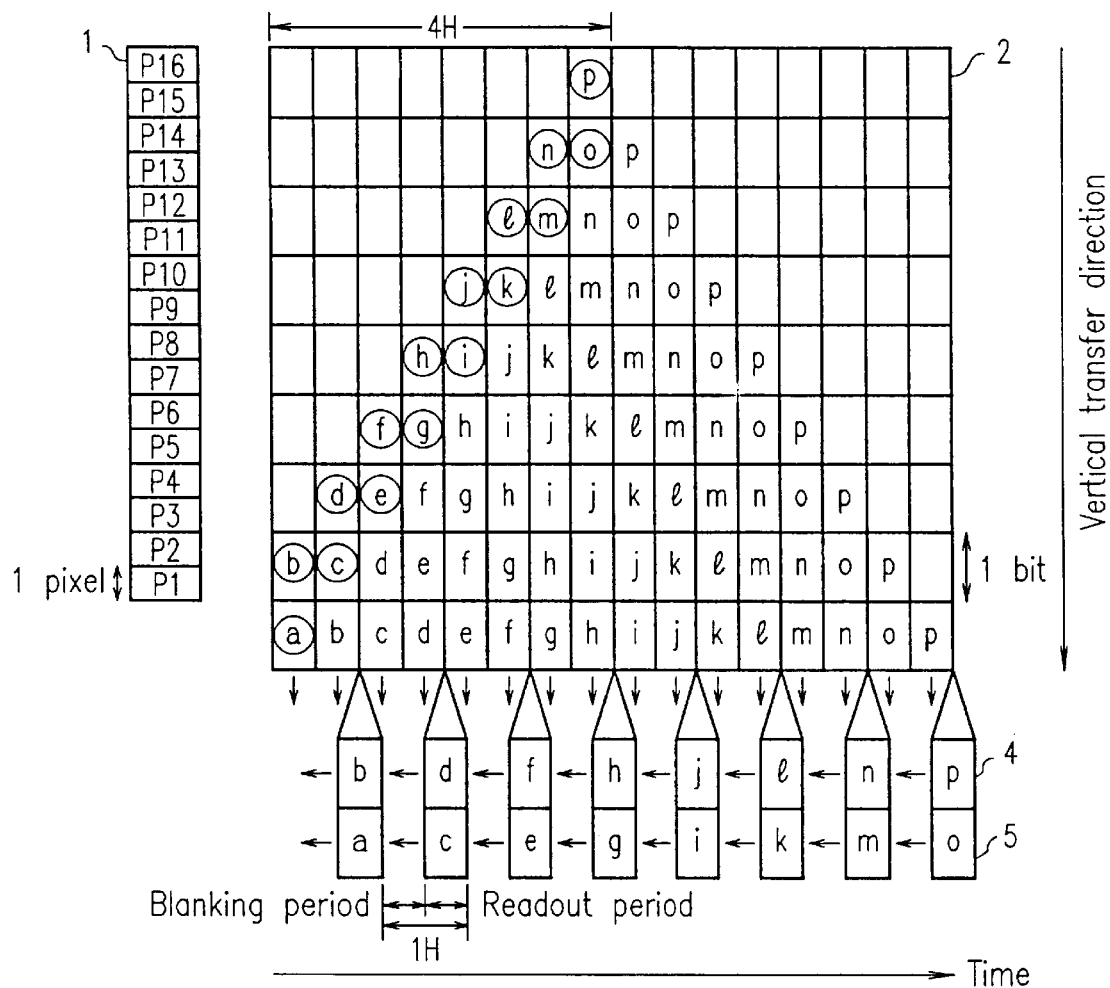
FIG. 2 schematically shows the operation of the solid-state imaging device shown in FIG. 1A, in the case where the number of pixels in a vertical direction is 16.

FIG. 2 schematically shows the operation of the solid-state imaging device shown in FIG. 1A, in the case where the total number of pixels in the vertical direction is 16 (P1 through P16). In this figure, the entire read operation for one screen is shown using a 1 bit transfer operation in the vertical direction as a unit. Here, the signals of the pixels P1, P2, etc. are denoted by a, b, etc. The mark ○ shows that a pixel signal is being read. The alphabets without the mark ○ show that signals are merely being moved in the vertical charge transfer portions 2. Each of the vertical transfer portion 2 transfers a 2 bit signal during one horizontal scanning period 1 H and reads signals of two pixels during a 1 bit transfer. Therefore, the readout of the signals of 16 pixels is completed in 4 H (2×2×4 H=16 pixels).

Since the horizontal charge transfer portion has a two-channel structure, signals of 8 vertically adjacent pixels (16/2=8) are read during the above period. The readout operation of the horizontal charge transfer portion is conducted after the completion of the 2 bit vertical transfer (which is conducted during the horizontal blanking period) and before the commencement of the next vertical transfer. After all the pixel signals are read to the vertical charge transfer portions 2, only the transfer operation is conducted (2 bit vertical transfer during 1 H) during 4 H. Thus, the signals of all the remaining 8 vertically adjacent pixels are read.

FIG. 3A shows a configuration of the vertical driving circuit 3 shown in FIG. 1A. Four-phase clocks $\phi_{v1}$, $\phi_{v2}$, $\phi_{v3}$, and $\phi_{v4}$ for vertical transfer are commonly connected to each gate $G_{ij}$ (i: bit number, j: 1 to 4). A pulse for reading a pixel signal is generated successively by the vertical scanning circuit 31 in the order of a pixel with a smaller number. The selection of the vertical transfer clock and the pulse for reading a pixel signal are conducted by an inversion circuit 32, a p-channel transistor 33, and an n-channel transistor 34.

More specifically, when a signal line 35 from the vertical scanning circuit 31 is at a low level, the transistor 33 is turned off and the transistor 34 is turned on. Therefore, either of the signal of a clock $\phi_{v1}$ and the signal of a clock $\phi_{v3}$ is applied to a gate driving line 36. When the signal line 35 from the vertical scanning circuit 31 is at a high level, the transistor 33 is turned on and the transistor 34 is turned off. Therefore, a pulse for reading a pixel signal from the vertical scanning circuit 31 is applied to the gate driving line 36. Thus, pulses with waveforms as shown in FIGS. 3B through 3K can be successively obtained by allowing the vertical scanning circuit 31 to generate a pulse at a high level only when a pixel signal is read and pulses at a low level in the other cases. Accordingly, the operation shown in FIGS. 1B through 1K is conducted.

EXAMPLE 2

Figure 4A:
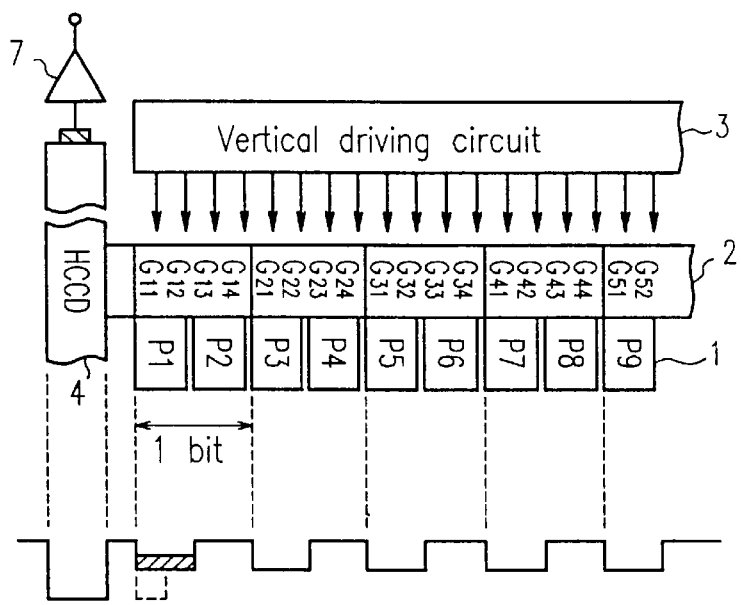
FIG. 4A is a schematic plan view showing a structure of a solid-state imaging device of Example 2 according to the present invention.

FIG. 4A is a schematic plan view showing a structure of a solid-state imaging device of Example 2 according to the present invention; FIGS. 4B through 4M show charge transfer timing. In this example, k=2 and q=1, i.e., two pixels correspond to one bit of a vertical charge transfer portion 2, and a horizontal charge transfer portion (HCCD) has a one-channel structure. In FIG. 4A, the components identical with those in FIG. 1A are denoted by the reference numerals identical therewith. The description thereof will be omitted. Hereinafter, a transfer operation will be described.

Figure 4B:
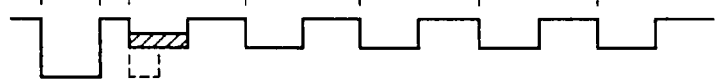
Figure 4C:
Figure 4E:
Figure 4F:
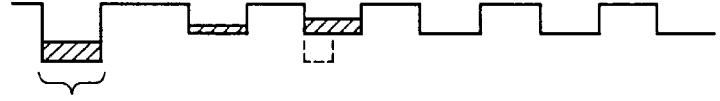
Figure 4H:
Figure 4I:
Figure 4K:
Figure 4L:

As shown in FIG. 4B, a signal of the first pixel P1 is read to the first bit of the vertical charge transfer portion 2. Then, as shown in FIG. 4C, the signal is transferred in the vertical direction by (k−1)/k=½ bits. Thereafter, a signal of the second pixel P2 is read to the first bit of the vertical charge transfer portion 2, and is transferred in the vertical direction by ½ bits.

Thus, the vertical charge transfer portion 2 transfers a signal by (q=1) bit by conducting the above operation q·k/(k−1)=2/1=2 times. As a result, a signal of one pixel is accumulated in a HCCD 4. Then, the signal of one pixel is transferred in the horizontal direction by the HCCD 4, whereby an output signal of one vertical pixel is obtained (see FIG. 4D).

The above-mentioned operation is repeated. Then, a signal of the i-th pixel Pi is read to the INT[{i−1)/k}+1]-th bit of the vertical charge transfer portion 2. Thereafter, the signal is transferred in the vertical direction by (k−1)/k=½ bits. Then, the operation is repeated under the condition that i=i+1. The HCCD 4 is driven every time the vertical charge transfer portion 2 transfers a signal by 1 bit, whereby a pixel signal of one pixel is obtained.

Figure 5:
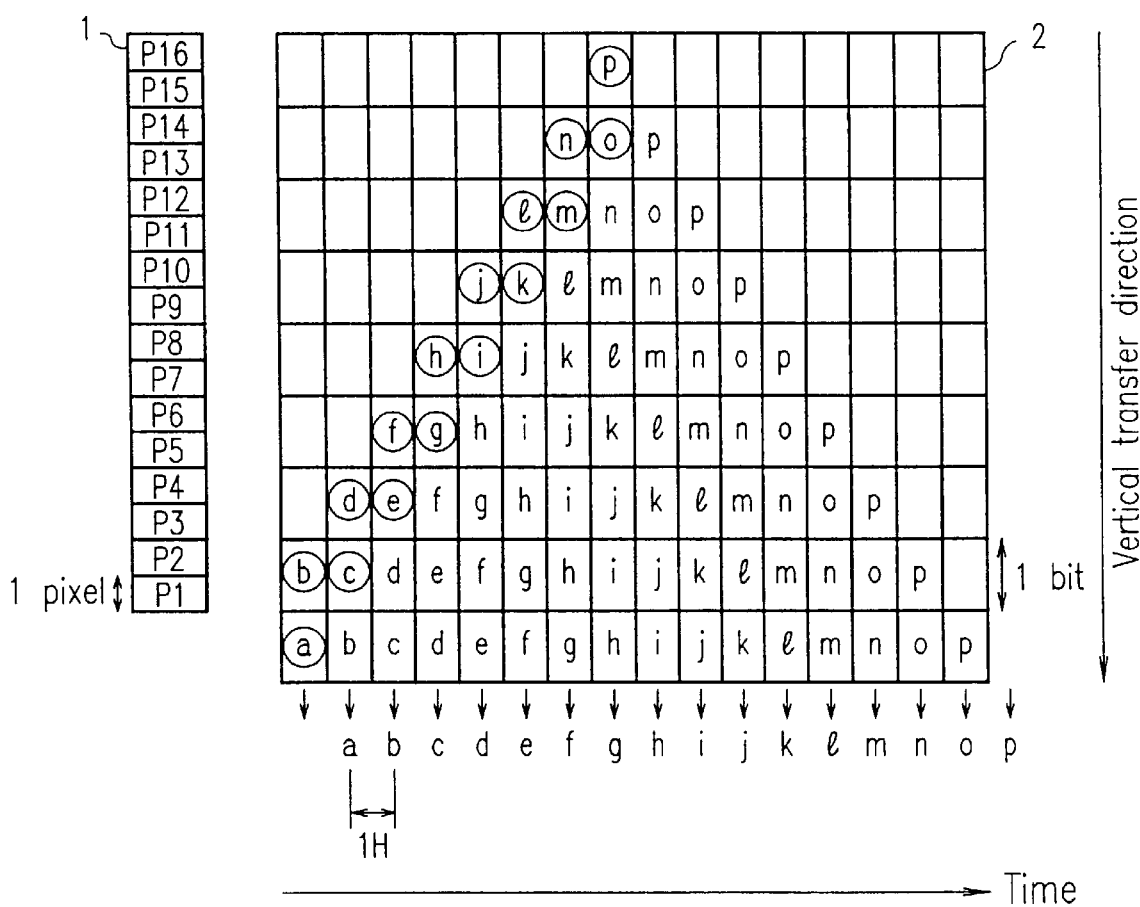
FIG. 5 schematically shows the operation of the solid-state imaging device shown in FIG. 4A, in the case where the number of pixels in a vertical direction is 16.

FIG. 5 schematically shows the operation of the solid-state imaging device shown in FIG. 4A, in the case where the total number of pixels in the vertical direction is 16. In this figure, the entire read operation for one screen is shown using a 1 bit transfer operation in the vertical direction as a unit. Here, the signals of the pixels P1, P2, etc. are denoted by a, b, etc. The mark ○ shows that a pixel signal is being read. The vertical charge transfer portion 2 transfers a 1 bit signal during one horizontal scanning period and reads signals of 2 pixels during a 1 bit transfer. Therefore, the readout of 16 pixels by the vertical charge transfer portion 2 is completed in 8 H. During this time, the vertical charge transfer portion 2 reads signals of 8 vertically adjacent pixels. The readout operation of the HCCD 4 is conducted after the completion of the 1 bit vertical transfer (which is conducted during the horizontal blanking period) and before the commencement of the next vertical transfer.

After all the pixel signals are read by the vertical charge transfer portion 2, only the transfer operation is conducted by a 1 bit vertical transfer per 1 H, which takes 8 H. Thus, the signals of the remaining 8 vertically adjacent pixels are read.

In Example 2, it is required to define a 1 H period to be ½, i.e., to read a signal at a speed twice that of Example 1, in order to make the signal readout period of the entire screen the same as that of Example 1.

EXAMPLE 3

Figure 6:
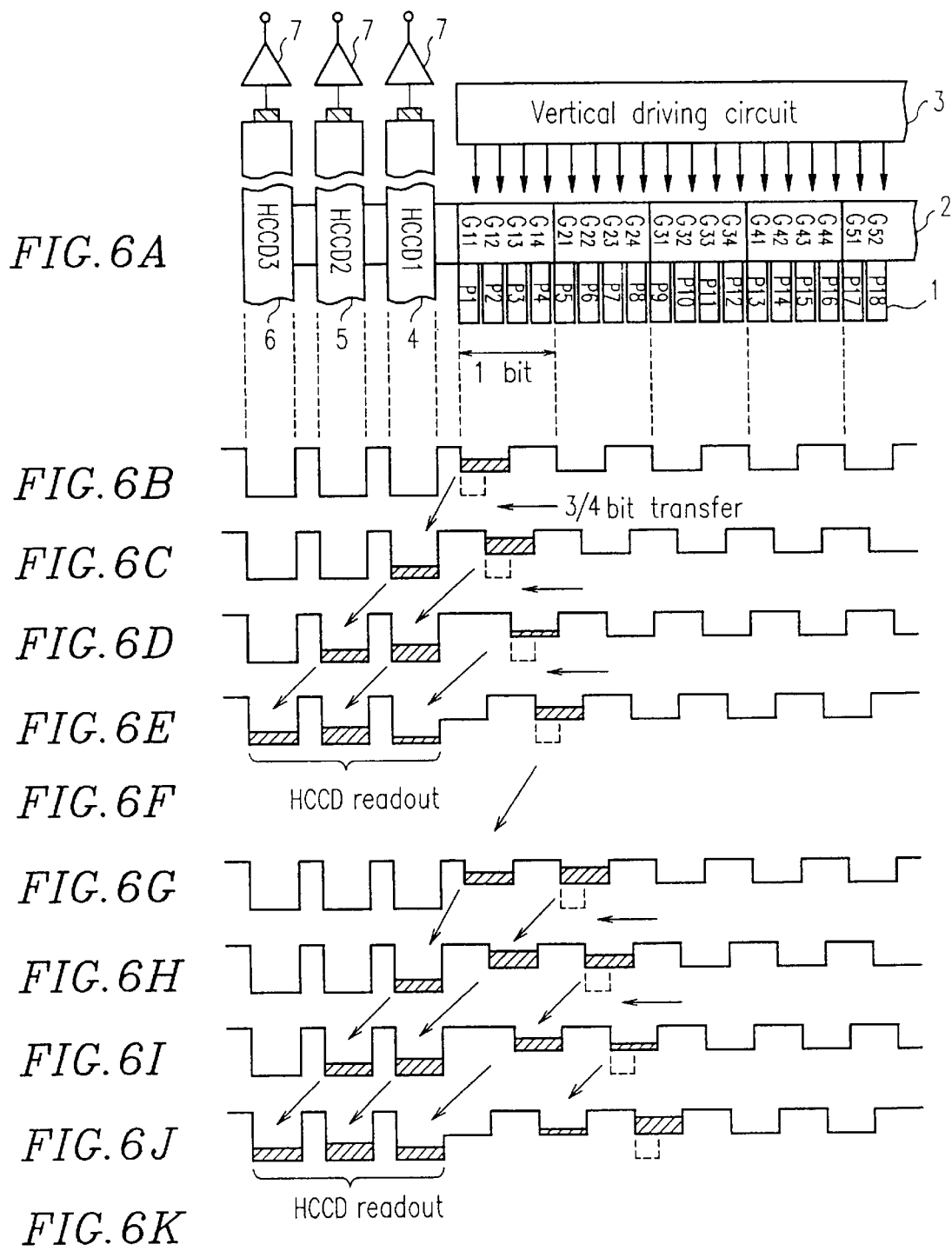
FIG. 6A is a schematic plane view showing a structure of a solid-state imaging device of Example 3 according to the present invention.
FIGS. 6B through 6K show charge transfer timing.

FIG. 6A is a schematic plan view showing a structure of a solid-state imaging device of Example 3 according to the present invention; FIGS. 6B through 6K show charge transfer timing. In this example, k=4 and q=3, i.e., four pixels correspond to one bit of a vertical charge transfer portion 2, and a horizontal charge transfer portion (HCCD) has a three-channel structure (HCCD1, HCCD2, and HCCD3). In FIG. 6A, the components identical with those in FIG. 1A are denoted by the reference numerals identical therewith. The description thereof will be omitted. Hereinafter, a transfer operation will be described.

As shown in FIG. 6B, a signal of the first pixel P1 is read to the first bit of the vertical charge transfer portion 2. Then, as shown in FIG. 6C, the signal is transferred in the vertical direction by (k−1)/k=¾ bits. Thereafter, a signal of the second pixel P2 is read to the first bit of the vertical charge transfer portion 2 and is transferred in the vertical direction by ¾ bits. Then, as shown in FIG. 6D, a signal of the third pixel P3 is read to the first bit of the vertical charge transfer portion 2 and is transferred in the vertical direction by $(k-1)/k$ ¾ bits. Then, as shown in FIG. 6E, a signal of the fourth pixel P4 is read to the first bit of the vertical charge transfer portion 2 and is transferred by ¾ bits.

Thus, the vertical charge transfer portion 2 transfers a signal by (q=3) bits by conducting the above operation $q \cdot k/(k-1) = 1\frac{2}{3} = 4$ times. As a result, signals of three pixels are accumulated in the HCCD1, HCCD2, and HCCD3. These signals are transferred in the horizontal direction by the HCCD1, HCCD2, and HCCD3, whereby output signals of three vertically adjacent pixels can be obtained (see FIG. 6F).

The above-mentioned operation is repeated. Then, a signal of the i-th pixel Pi is read to the $INT[\{(i-1)/k\}+1]$-th bit of the vertical charge transfer portion 2. Thereafter, the signal is transferred in the vertical direction by $(k-1)/k = ¾$ bits. Then, the operation is repeated under the condition that i=i+1. The HCCD1, HCCD2, and HCCD3 are driven every time the vertical charge transfer portion 2 transfers a signal by 3 bits, whereby pixel signals of three vertically adjacent pixels can be obtained.

In the above-mentioned operation, signals of 4 pixels are read per bit of the vertical charge transfer portion 2 successively without posing any inbetween blank bit portion and without being mixed. Irrespective of this fact, the whole signal amount corresponding to one bit can be handled by the vertical charge transfer portion 2. Thus, a large value can be obtained. Thus, in Example 3, the same effect as that of Example 1 can be obtained.

The case of q=3 is described with reference to FIG. 6A. However, the same effect can also be obtained even in the case of q=2 or q=1, if the readout operation of the horizontal transfer portion is conducted more often. More specifically, by conducting the readout operation every time signal charge is accumulated in each horizontal transfer portion, the same effect can be obtained.

Since $p = q \cdot k/(k-1)$ does not become an integer, it is required to set the repetition time to be a combination of $INT[p]$ and $INT[p+1]$ so that its average becomes p.

EXAMPLE 4

Figure 7:
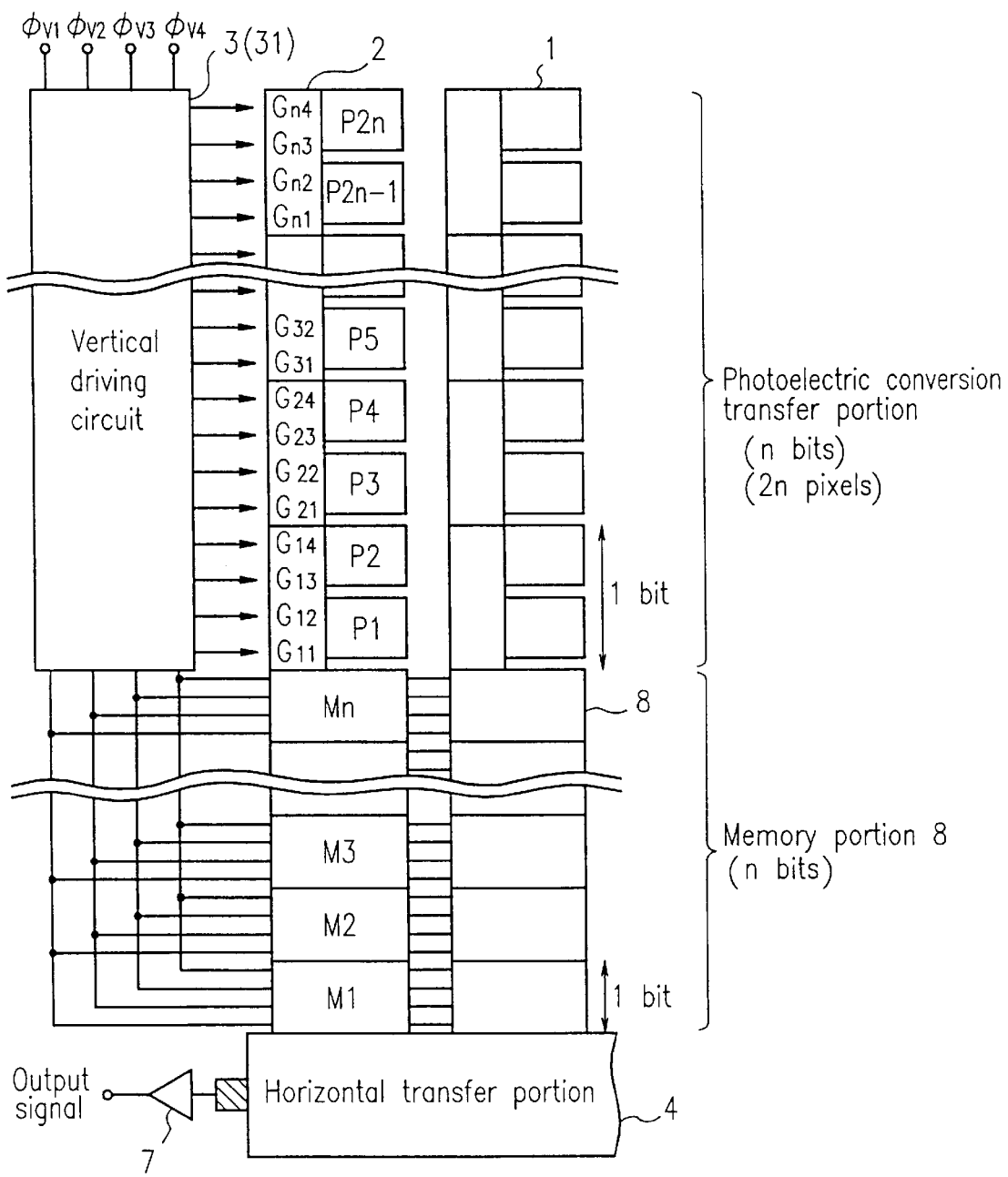
FIG. 7 is a schematic plan view showing a structure of a solid-state imaging device of Example 4 according to the present invention.

FIG. 7 is a schematic plan view of a solid-state imaging device of Example 4 according to the present invention. In this example, a third charge transfer portion, i.e., a memory portion 8 is provided between a vertical charge transfer portion 2 and a horizontal charge transfer portion 4. Here, the number of bits of the memory portion 8 is n which is the same as that of the vertical charge transfer portion 2. In this example, the case where k=2 and q=1 is shown. However, the following description is similarly applicable to the other combinations. The memory portion 8 is directly driven by four-phase clocks $\phi_{v1}$ through $\phi_{v4}$. The components identical with those in Example 1 are denoted by the reference numerals identical therewith.

Figure 8:
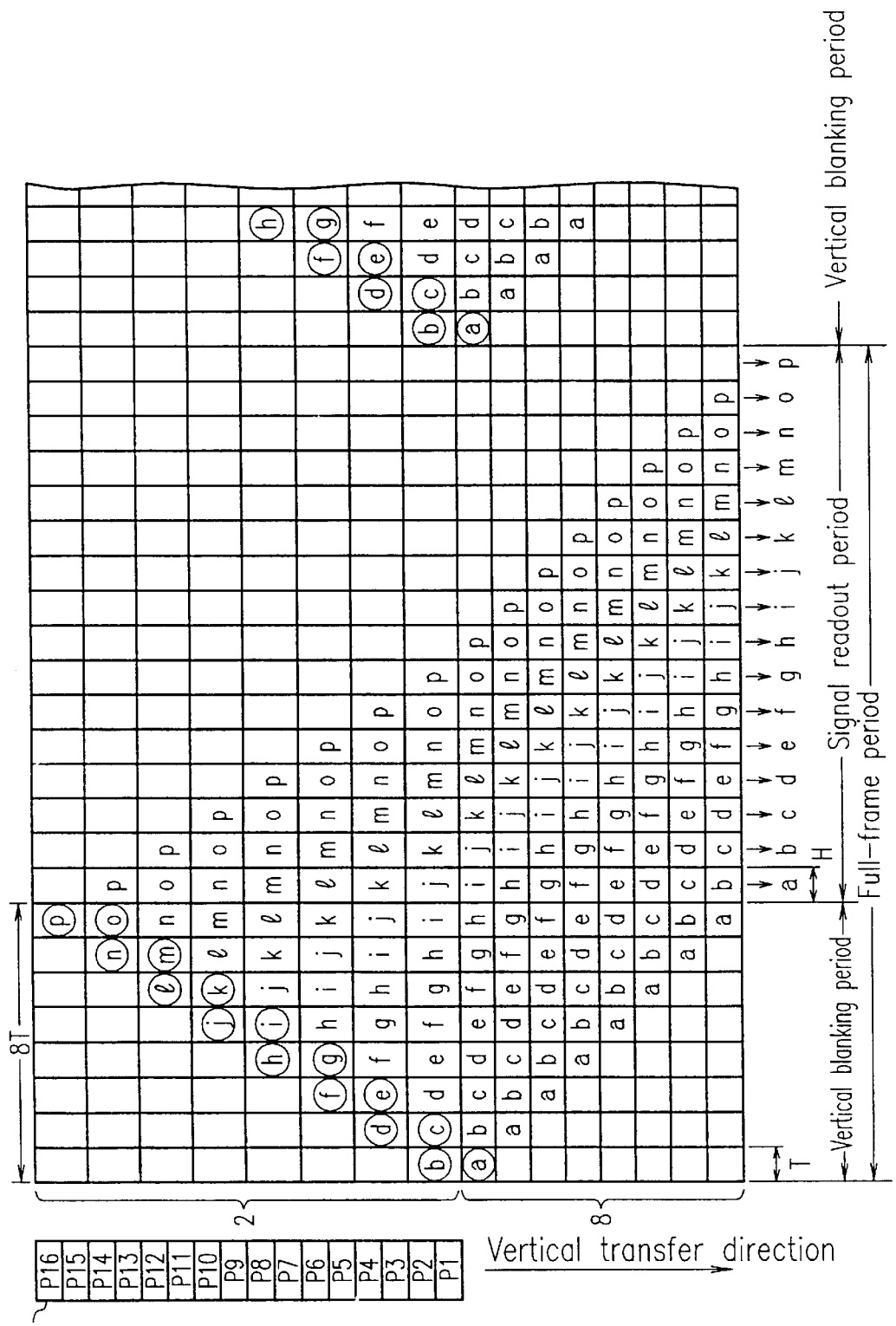
FIG. 8 schematically shows the operation of the solid-state imaging device shown in FIG. 7, in the case where the number of pixels in a vertical direction is 16.

The operation of the solid-state imaging device of Example 4 will be described with reference to FIG. 8. FIG. 8 shows the case where the total number of pixels is 16, and the entire read operation for one screen is shown using a 1 bit transfer operation in the vertical direction as a unit. Here, the signals of the pixels P1, P2, etc. are denoted by a, b, etc. The mark ○ shows that a pixel signal is being read.

As shown in FIG. 8, the readout of pixel signals and the ½ bit transfer are repeated with a period T continuously 16 times during a vertical blanking period. Thus, the readout of 16 pixels is completed during the vertical blanking period.

Here, 1 T is a period which is sufficiently shorter than 1 H in FIG. 2. The reason for this is as follows: As shown in FIG. 2, a period during which the horizontal charge transfer reads a pixel signal in the horizontal direction is required, and the 1 H period shown in FIG. 2 includes this readout period.

At this time, the memory portion 8 is driven by a vertical driving circuit 3 in synchronization with the vertical charge transfer portion 2. Therefore, signals of 8 vertically adjacent pixels are accumulated in the memory portion 8, while signals of the remaining 8 pixels are stored in the vertical charge transfer portion 2.

Then, all the signals of 16 pixels stored in the memory portion 8 and the vertical charge transfer portion 2 are transferred by an ordinary transfer operation by 1 vertical bit per 1 H during a 16 H readout period.

The above-mentioned operation is repeated, whereby the readout of the entire screen is continuously conducted.

As described above, in Example 4, the period from the readout of the first pixel P1 to the readout of the last pixel P16 can be shorter than that in Example 1. The reason for this will be described below.

As shown in FIG. 2, it takes an 8 H period to read the signals a through p. In contrast, as shown in FIG. 8, it takes an 8 T period to read the signals a through p. As described above, 1 T is sufficiently shorter than 1 H. Thus, in Example 4, the signal readout period can be substantially shortened, compared with Example 1.

EXAMPLE 5

Figure 9:
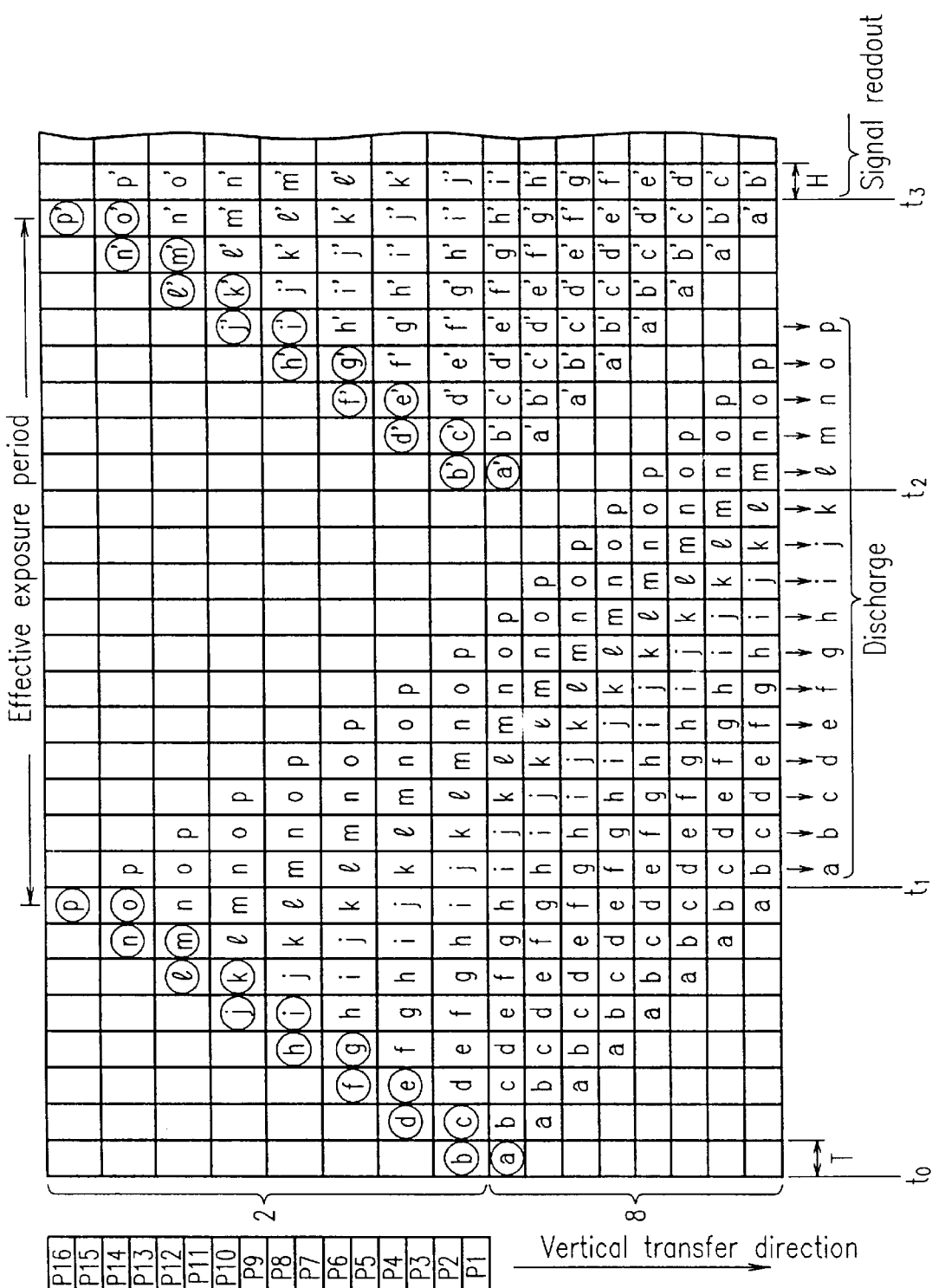
FIG. 9 schematically shows the operation of a solid-state imaging device of Example 5 according to the present invention, in the case where the number of pixels in a vertical direction is 16.

The operation of a solid-state imaging device of Example 5 according to the present invention will be described with reference to FIG. 9. In Example 5, a different driving system is adopted in the same device as that in Example 4. The detail of its operation will be described in the case where the total number of pixels in the vertical direction is 16. In this example, the entire read operation for one screen is also shown using a 1 bit transfer operation in the vertical direction as a unit. The components identical with those in Example 4 are denoted by the reference numerals identical therewith. In the same way as the above, the signals of the pixels P1, P2, etc. are denoted by a, b, etc. The mark ○ shows that a pixel signal is being read.

The readout of pixel signals and the ½ bit transfer are repeated with a period T continuously 16 times (in Example 5, 1 T is also a period sufficiently shorter than 1 H), and the readout of all the signals of 16 pixels is completed in a period from $t_0$ to $t_1$. At this time, the memory portion 8 is driven by a vertical driving circuit 3 in synchronization with the vertical charge transfer portion 2. Therefore, signals of 8 vertically adjacent pixels are accumulated in the memory portion 8, while signals of the remaining 8 pixels are stored in the vertical charge transfer portion 2.

Then, all the signals of 16 pixels stored in the memory portion 8 and the vertical charge transfer portion 2 are transferred by more than 8 bits within a period T. The signals output at this time are completely discharged during a period from $t_1$ to $t_2$. During this operation, the signal charge is completely read from the vertical charge transfer portion 2 and the vertical charge transfer portion becomes blank, so that the subsequent readout of pixel signals (in this case, as shown in FIG. 9, signals are denoted by a', b', etc. so as to be discriminated from the first signal) is made possible. The readout of pixel signals and the ½ bit transfer are repeated with a period T continuously 16 times, and the readout of all the new signals a' through p' of 16 pixels is completed in a period from $t_2$ to $t_3$ At this time, the memory portion 8 is driven by the vertical driving circuit 3 in synchronization with the vertical charge transfer portion 2. Therefore, signals a' through h' of 8 vertically adjacent pixels are accumulated in the memory portion 8, while signals i' through p' of the remaining 8 pixels are stored in the vertical charge transfer portion 2. The signals output during this time are all discharged. Thereafter, the signals a' through p' are read one by one within a period of 1 H.

Because of the above operation, the effective exposure period of the second signals a' through p' can be set at an arbitrary value of 16 T or more. Thus, if T is set to be sufficiently short, an electronic shutter operation which is conducted at a low speed to a high speed is made possible. That is, an electronic shutter operation is made possible, in which an interval up to the next readout can be freely set.

In the above-mentioned operation, the period per 1 bit transfer is set to be T from time $t_0$ to time $t_3$. However, electric charge is merely discharged from time $t_1$ to time $t_2$, so that the period can be set to be T" which is shorter than T.

Figure 10A:
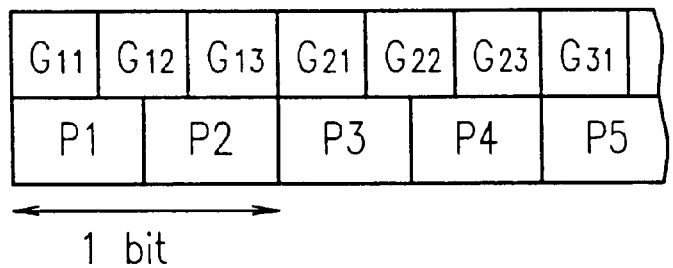
FIGS. 10A through 10C show modified examples of the solid-state imaging device of Example 1 according to the present invention.
Figure 10B:
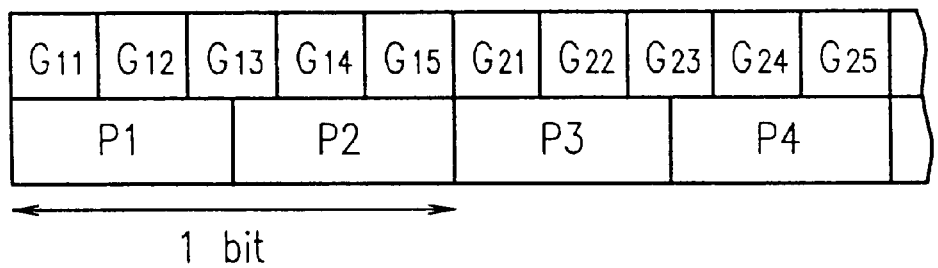
Figure 10C:
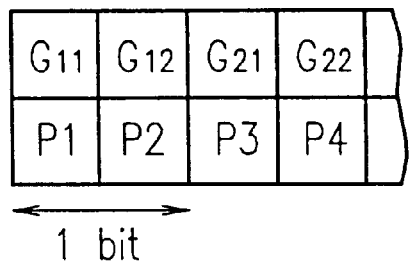

In Example 1, the case where k=2 and m=4, i.e., the case where two pixels correspond to one bit and four-phase driving is conducted is described. However, various combinations of k and m can be selected. FIGS. 10A, 10B, and 10C show examples of different combinations of k and m, respectively. FIG. 10A shows the case where k=2 and m=3; FIG. 10B shows k=2 and m=5; and FIG. 10C shows the case where k=2 and m=2.

EXAMPLE 6

FIG. 11A is a schematic plan view showing a structure of a solid-state imaging device of Example 6 according to the present invention; FIGS. 11B through 11N show charge transfer timing. In the solid-state imaging device of Example 6, a wide dynamic range is obtained by altering a driving method. The components identical with those in Example 1 are denoted by the reference numerals identical therewith.

The solid-state imaging device of Example 6 adopts a driving system in which signals of 2 vertically adjacent pixels are read under the condition of being added to each other. Thus, strictly speaking, this is not a progressive scan readout. It is noted that, for simplicity of description, one pixel corresponds to one bit in FIG. 12.

Since signals of 2 vertically adjacent pixels are read under the condition of being added to each other in Example 6, the pixels P1 and P2, P3 and P4, etc. in Example 1 are denoted as the pixels P1 and P1, P2 and P2, etc. or the pixels a and b, d and d are denoted as a and a, b and b, etc. (see FIGS. 11A through 11N).

Hereinafter, the operation of the solid-state imaging device of Example 6 in the case where k=2 and q=2 will be described.

As shown in FIG. 11B, a signal a of the first pixel P1 is read to the first bit of a vertical charge transfer portion 2. Then, a signal is transferred in the vertical direction by 2(k−1)/k=1 bit. Thereafter, a signal b of the second pixel P2 is read to the second bit of the vertical charge transfer portion 2, and a signal is transferred by 1 bit (see FIG. 1C). As a result of the operation, a blank bit corresponding to one bit occurs between the signal a and the signal b in the vertical charge transfer portion 2.

The vertical charge transfer portion 2 performs a 2 bit transfer during 1 H. Therefore, a signal of one pixel is accumulated in an HCCD1 and a blank signal is accumulated in an HCCD2.

Figure 12:
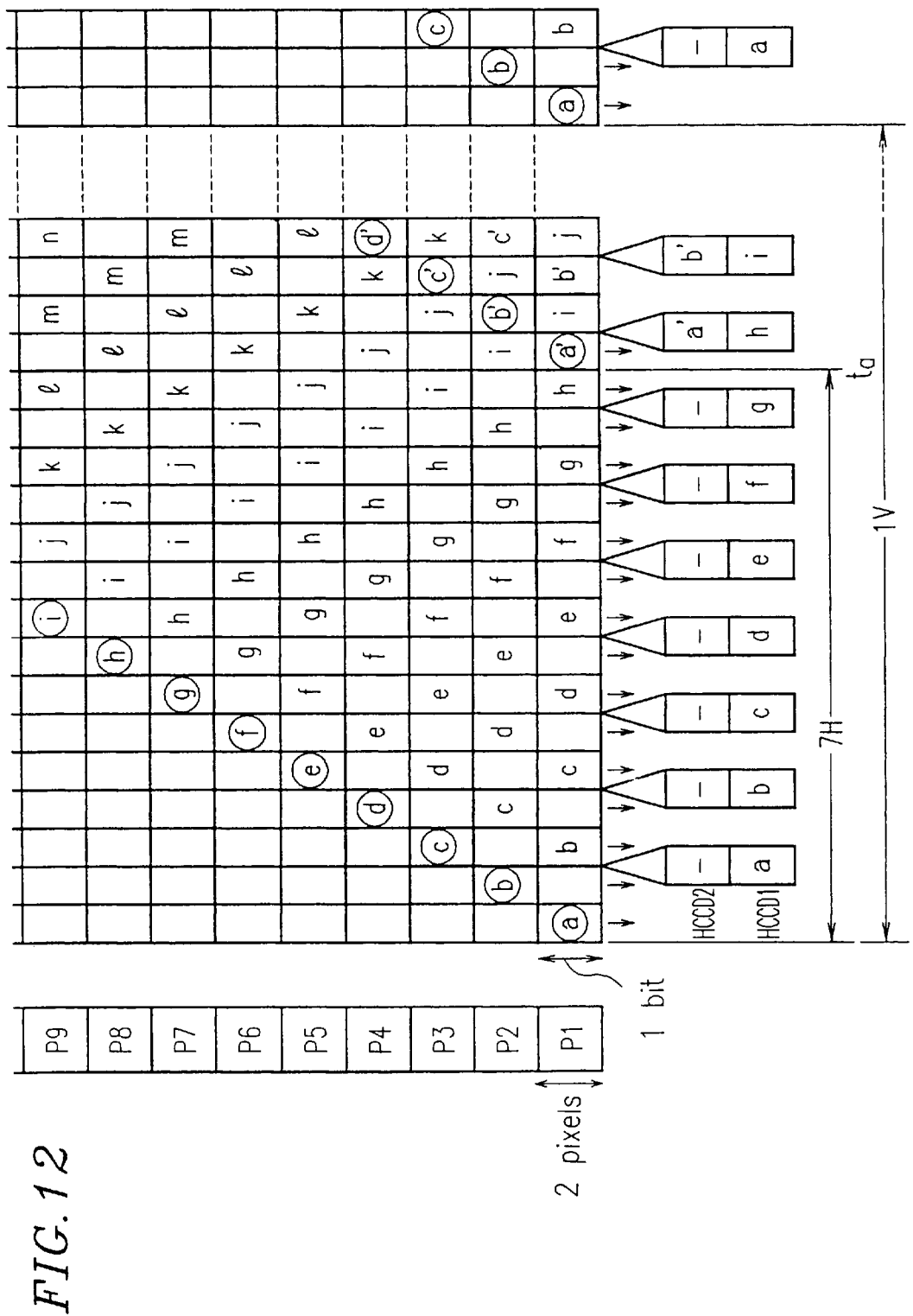
FIG. 12 schematically shows the operation of the solid-state imaging device of Example 6 according to the present invention.

Hereinafter, in the same way as the above, as shown in FIGS. 11A through 11N, and 12, (1) a signal of the j-th pixel Pj is read to the j-th bit of the vertical charge transfer portion 2, wherein the signal of the j-th pixel Pj is obtained by adding the signal of the i-th pixel to the signal of the (i+1)-th pixel; (2) signal charge is transferred in the vertical direction by one bit, and (3) i=i+2 (i.e., j=j+1) is defined. Then, the steps (1) through (3) are repeated. Simultaneously, (4) the HCCD1 and HCCD2 are driven during a transfer operation of signals of 2 bits by the vertical charge transfer portion 2, whereby a signal of vertical one pixel and a blank signal are obtained in parallel.

The above-mentioned operation is conducted up to the pixel portion farthest from the HCCD1, whereby signals a, b, c, . . . are obtained from the HCCD1.

On the other hand, at a time when the operation of the steps (1) through (3) has been repeated 2r+1 times, i.e., at a time $t_a$ when the signals of the first pixel through the 2(2r+1)-th pixel have been read to the vertical charge transfer portion (r=7 in FIGS. 11A through 11N and 12), the steps (1) through (3) are repeated from the first pixel, whereby signals a', b', c', . . . are obtained from the HCCD2.

The signals a', b', c', . . . are read to bits between the signals a, b, c, . . . , so that the vertical charge transfer portion 2 alternately reads two kinds of signal sequences (a, b, c, . . . ) and (a', b', c', . . . ) without posing any inbetween blank bit.

Thus, the signal sequence (a, b, c, . . . ) is obtained from the HCCD1, and the signal sequence (a', b', c', . . . ) is obtained from the HCCD2. It should be noted that a time shift of rH occurs between a and a', b and b', . . .

When the above-mentioned operation is repeated per 1V period, the exposure time becomes 1V−rH in the previously obtained signal sequence (a, b, c, . . . ), while the exposure time becomes rH in the signal sequence (a', b', c', . . . ) obtained later.

For example, 1V is 262.5 H in accordance with the NTSC standard, so that (1V−rH):rH=255.5:7. Therefore, the same image information is obtained with greatly different exposure times. This is effective for a wide dynamic range operation. The reason for this will be described with reference to FIGS. 13A and 13B.

Figure 13A:
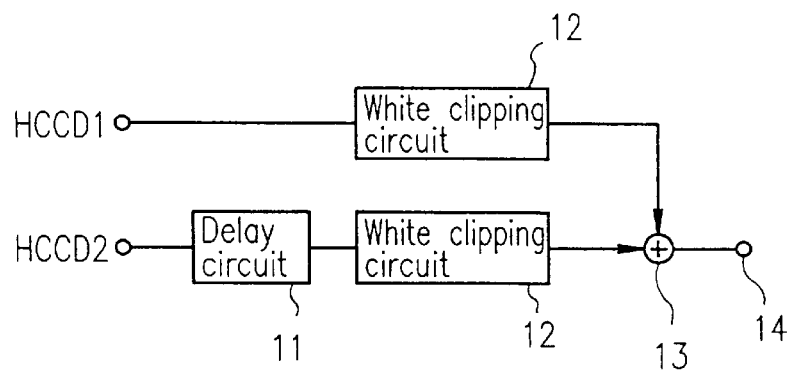
FIG. 13A is a block diagram showing a signal processing system of the solid-state imaging device of Example 6 according to the present invention.
Figure 13B:
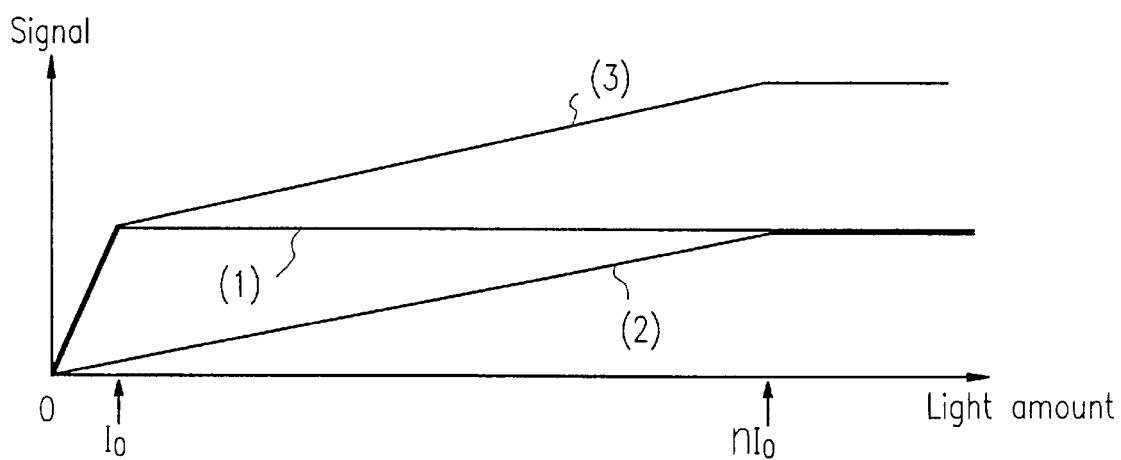
FIG. 13B is a graph showing the relationship between the light amount and the signal.
Figure 14A:
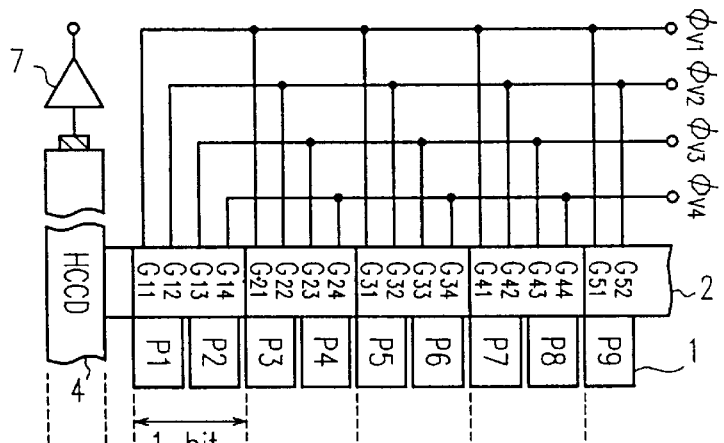
FIG. 14A is a schematic plan view showing a structure of a conventional solid-state imaging device.
Figure 14B:
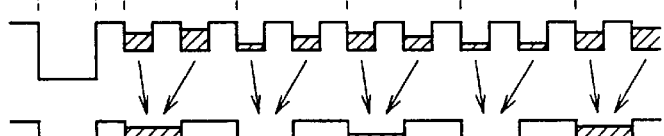
Figure 14D:
Figure 14E:
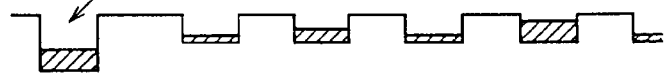
Figure 14F:
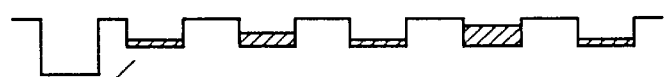
Figure 14G:
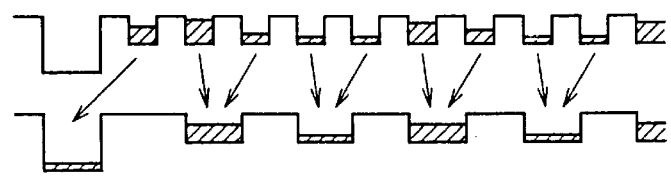
Figure 14I:
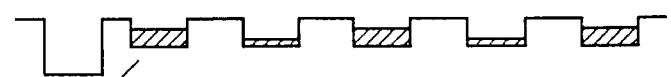
Figure 14J:
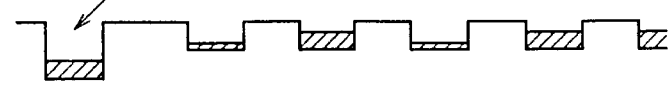
Figure 14K:

FIG. 13A shows a signal processing system of a solid-state imaging device of Example 6. FIG. 13B shows the relationship between the light amount and the signal. The signal processing system includes a delay circuit 11, white clipping circuits 12 regulating a white level to a predetermined value equal to or less than the light amount of a saturated signal, and an adder 13. In order to simultaneously obtain the signal sequences (a, b, c, . . . ) and (a', b', c', . . . ) transferred from the HCCD1 and HCCD2, the previously obtained signal sequence (a, b, c, . . . ) is passed through the delay circuit 11 so as to be delayed by rH.

Then, the signal sequences (a, b, c, . . . ) and (a', b', c', . . . ) are passed through the white clipping circuits 12, respectively. Thereafter, the signal sequences (a, b, c, . . . ) and (a', b', c', . . . ) are added to each other by the adder 13, whereby a signal 14 with a wide dynamic range can be obtained.

In FIG. 13B, the signal sequences (a, b, c, . . . ) and (a', b', c', . . . ) passed through the white clipping circuits 12 are represented by (1) and (2).

As described above, the exposure time ratio, i.e., sensitivity ratio between the signal sequence (a, b, c, . . . ) and the signal sequence (a', b', c', . . . ) becomes (1V−rH):rH=n:1. Therefore, the ratio of the saturated light amount becomes $I_0:nI_0$.

The signal 14 is represented by (3) in FIG. 13B. As is understood from FIG. 13B, the saturated light amount can be increased by n times while high sensitivity is maintained at a low light amount. Specifically, in Example 6, a wide dynamic range is achieved. Therefore, a subject can be imaged clearly without any blurs, even in the case where back-light is present in the subject. A solid-state imaging device with a gray-scale over a wide range of a light amount can be obtained.

Furthermore, in the solid-state imaging device of Example 6, a wide dynamic range can be obtained merely by partly altering the structure of the vertical driving circuit 3 and adopting the driving system in accordance therewith. Therefore, a solid-state imaging device with ease of use in which various options can be selected can be obtained.

Furthermore, such selection can be made merely by partly altering the vertical driving circuit portion. Thus, a solid-state imaging device with ease of use can be realized without great increase in cost.

According to the present invention, every time a pixel signal is transferred by (k−1)/k bits by the vertical charge transfer portion (first charge transfer means), a pixel signal of one pixel is successively read from a pixel portion to the vertical charge transfer portion in the order from the side closest to the horizontal charge transfer portion (second charge transfer means). Therefore, even when k pixels correspond to one bit of the vertical charge transfer portion, all the pixel signals can be read successively. Thus, the pixel density can be increased by k times, compared with the conventional examples, under the condition that one pixel signal is handled per bit of the vertical charge transfer portion.

As a result, one bit of the vertical charge transfer portion corresponds to the length which is k times a pixel pitch, so that a large charge handling capacity can be obtained. This overcomes the problems involved in the conventional progressive scan type CCD during the progressive scan operation.

Furthermore, in the above-mentioned structure, merely by altering the driving system of a driving portion providing a clock for transfer of signals to the vertical charge transfer portion, a progressive scan operation with a large charge handling capacity can be realized without altering the structures of the pixel portion and the vertical charge transfer portion. Specifically, it is not required to substantially alter the structure of the conventional progressive scan type CCD; therefore, the CCD as described above can be easily produced.

Furthermore, since k pixels correspond to one bit of the vertical charge transfer portion, the density of the vertical charge transfer portion can be relaxed to 1/k. This enables an imaging device to have more pixels and to be miniaturized. High performance such as high sensitivity, a wide dynamic range, etc. can be obtained.

According to the structure in which the vertical charge transfer portion performs a q bit transfer operation per horizontal scanning period, the transfer operation is periodically performed in a continuous manner. Thus, a signal is not likely to be stored in a stationary state for a long time. Specifically, a signal read from a pixel portion farther from the horizontal charge transfer portion is not likely to be stored in a stationary state for a longer period of time, and a dark current is equally divided in each of the vertical charge transfer portions. Therefore, a fixed pattern noise does not occur.

The solid-state imaging device of the present invention has an advantage of a shortened readout time and enables an electronic shutter operation with a variable shutter time.

According to the present invention, a wide dynamic range is obtained, and a subject is imaged on an entire screen without being blurred even in the case where very strong light such as back-light is present in the subject.

Furthermore, a solid-state imaging device with ease of use can be obtained, in which various options can be selected with slight alterations in design. Such selection can be made merely by altering a part of the vertical charge transfer circuit portion. Therefore, a solid-state imaging device with ease of use can be obtained without great increase in cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A solid-state imaging device, comprising:

a pixel portion including n pixels arranged in a first direction, converting incident light into electric charge and accumulating generated signal charge;

a first charge transfer portion connected to the pixel portion, transferring a signal read from each of the pixels of the pixel portion in the first direction, k pixels corresponding to one bit;

a second charge transfer portion connected to one end of the first charge transfer portion, receiving the signal transferred by the first charge transfer portion and transferring the received signal in a second direction substantially orthogonal to the first direction;

an output circuit connected to one end of the second charge transfer portion, receiving the signal transferred by the second charge transfer portion and converting the received signal into an image signal to output it to an external device; and a driving circuit for driving the first charge transfer portion, wherein the driving circuit drives the first charge transfer portion so as to (1) read a signal from an i-th pixel counted from the side of the second charge transfer portion among the n pixels arranged in the pixel portion to a j-th bit portion of the first charge transfer portion, (2) transfer the read signal in the first direction by (k−1)/k bits, (3) define i=i+1, and (4) repeat the steps (1) through (3) from a first pixel closest to the second charge transfer portion to a pixel farthest from the second charge transfer portion among the pixels arranged in the pixel portion, where k is an integer of 2 or more, and j=INT[{(i−1)/k}+1] (INT[ ] is an integer portion of [ ] (a fractional portion is discarded)).

2. A solid-state imaging device according to claim 1, wherein, after an n-th pixel farthest from the second charge transfer portion is read, the driving circuit conducts an operation of a step (5) of generating a plurality of driving signals in such a manner as to allow the first charge transfer portion to perform only a transfer operation.

3. A solid-state imaging device according to claim 1, wherein the second charge transfer portion has q charge transfer channels, where q is an integer of 1 or more.

4. A solid-state imaging device according to claim 1, wherein the first charge transfer portion has an m-phase driving structure, and the driving circuit includes a scanning circuit for successively providing a pulse for reading the signal to the first charge transfer portion and a clock supply circuit for supplying an m-phase clock for transfer of the signal to the first charge transfer portion, where m is an integer of 2 or more.

5. A solid-state imaging device according to claim 3, wherein the steps (1) through (3) are repeated p=q·k/(k−1) times during a horizontal blanking period of an image signal, and a signal is read from the second charge transfer portion composed of q channels during a horizontal scanning period, and, in the case where p is not an integer, p is determined by a combination of INT[p] and INT[p+1].

6. A solid-state imaging device according to claim 1, wherein a third charge transfer portion having n/k bits or more in the first direction is provided between the first charge transfer portion and the second charge transfer portion, and the third charge transfer portion works as a memory portion.

7. A solid-state imaging device according to claim 6, wherein the third charge transfer portion has the same phase-number driving structure as the first charge transfer portion, and the driving circuit drives the first charge transfer portion and the third charge transfer portion so as to synchronize the first charge transfer portion with the third charge transfer portion during charge transfer in the first direction.

8. A solid-state imaging device according to claim 6, wherein the steps (1) through (4) are conducted during a vertical blanking period of an image signal, and the step (5) is conducted during a signal readout period.

9. A solid-state imaging device according to claim 6, wherein, after the steps (1) through (4) are conducted, the steps (1) through (4) are conducted again during the step (5) and after signal charge in the first charge transfer portion is transferred to the third charge transfer portion, the step (5) is conducted again, and an effective exposure period of a signal output during the step (5) is arbitrarily set.

10. A solid-state imaging device, comprising:
   a pixel portion including n pixels arranged in a first direction, converting incident light into electric charge and accumulating generated signal charge;
   a first charge transfer portion connected to the pixel portion, transferring a signal read from each of the pixels of the pixel portion in the first direction, k pixels corresponding to one bit;
   a second charge transfer portion connected to one end of the first charge transfer portion, receiving the signal transferred by the first charge transfer portion and transferring the received signal in a second direction substantially orthogonal to the first direction;
   an output circuit connected to one end of the second charge transfer portion, receiving the signal transferred by the second charge transfer portion and converting the received signal into an image signal to output it to an external device; and
   a driving circuit for driving the first charge transfer portion,
   wherein the driving circuit drives the first charge transfer portion so as to (1) read signals from an i-th pixel and an (i+1)-th pixel counted from the side of the second charge transfer portion among the n pixels arranged in the pixel portion to a j-th bit portion of the first charge transfer portion in such a manner that the signals are added to each other, (2) transfer the read signal in the first direction by 2(k−1)/k bits, (3) define i=i+2, (4) repeat the steps (1) through (3) from a first pixel closest to the second charge transfer portion to a pixel farthest from the second charge transfer portion among the pixels arranged in the pixel portion, and (5) after time $t_a$ when the steps (1) through (3) are repeated up to a 2(2r+1)-th pixel in the middle of the step (4), repeat the steps (1) through (3) from a first pixel closest to the second charge transfer portion to a pixel farthest from the second charge transfer portion among the pixels arranged in the pixel portion,
   wherein the steps (4) and (5) are simultaneously conducted after the time $t_a$,
   where k is an integer of 2 or more, r is an integer of 1 or more, and j=INT[{(i−1)/k}+1] (INT[ ] is an integer portion of [ ] (a fractional portion is discarded)).

11. A solid-state imaging device according to claim 10, wherein, after an n-th pixel farthest from the second charge transfer portion is read during the step (5), the driving circuit conducts an operation of a step (6) of generating a plurality of driving signals in such a manner as to allow the first charge transfer portion to perform only a transfer operation.

12. A solid-state imaging device according to claim 10, wherein the second charge transfer portion has q charge transfer channels, where q is an integer of 1 or more.

13. A solid-state imaging device according to claim 10, wherein the first charge transfer portion has an m-phase driving structure, and the driving circuit includes a scanning circuit for successively providing a pulse for reading the signal to the first charge transfer portion and a clock supply circuit for supplying an m-phase clock for transfer to the first charge transfer portion, where m is an integer of 2 or more.

14. A solid-state imaging device according to claim 12, wherein the steps (1) through (3) are repeated p=q·k/[(k−1)·2] times during a horizontal blanking period of an image signal, and a signal is read from the second charge transfer portion composed of q channels during a horizontal scanning period, and, in the case where p is not an integer, p is determined by a combination of INT[p] and INT[p+1].

15. A solid-state imaging device according to claim 10, wherein, assuming that a signal obtained during the step (4) is a first signal and a signal obtained during the step (5) is a second signal, the first signal is passed through a delay circuit delaying a signal by rH (H is one horizontal scanning period), the first signal and the second signal are passed through two white clipping circuits regulating a white level to a predetermined value equal to or less than a light amount of a saturated signal, and the first signal and the second signal from the two white clipping circuits are added to each other.

16. A method for driving a solid-state imaging device comprising:
   a pixel portion including n pixels arranged in a first direction, converting incident light into electric charge and accumulating generated signal charge;
   a first charge transfer portion connected to the pixel portion, transferring a signal read from each of the pixels of the pixel portion in the first direction, k pixels corresponding to one bit;
   a second charge transfer portion connected to one end of the first charge transfer portion, receiving the signal transferred by the first charge transfer portion and transferring the received signal in a second direction substantially orthogonal to the first direction;
   an output circuit connected to one end of the second charge transfer portion, receiving the signal transferred by the second charge transfer portion and converting the received signal into an image signal to output it to an external device; and
   a driving circuit for driving the first charge transfer portion, the method including the steps of: (1) reading a signal from an i-th pixel counted from the side of the second charge transfer portion among the n pixels arranged in the pixel portion to a j-th bit portion of the first charge transfer portion, (2) transferring the read signal in the first direction by (k−1)/k bits, (3) defining i=i+1, and (4) repeating the steps (1) through (3) from a first pixel closest to the second charge transfer portion to a pixel farthest from the second charge transfer portion among the pixels arranged in the pixel portion, where k is an integer of 2 or more, and j=INT[{(i−1)/k}+1] (INT[ ] is an integer portion of [ ] (a fractional portion is discarded)).

17. A method for driving a solid-state imaging device comprising:

a pixel portion including n pixels arranged in a first direction, converting incident light into electric charge and accumulating generated signal charge;

a first charge transfer portion connected to the pixel portion, transferring a signal read from each of the pixels of the pixel portion in the first direction, k pixels corresponding to one bit;

a second charge transfer portion connected to one end of the first charge transfer portion, receiving the signal transferred by the first charge transfer portion and transferring the received signal in a second direction substantially orthogonal to the first direction;

an output circuit connected to one end of the second charge transfer portion, receiving the signal transferred by the second charge transfer portion and converting the received signal into an image signal to output it to an external device; and a driving circuit for driving the first charge transfer portion, the method including the steps of: (1) reading signals from an i-th pixel and an (i+1)-th pixel counted from the side of the second charge transfer portion among the n pixels arranged in the pixel portion to a j-th bit portion of the first charge transfer portion in such a manner that the signals are added to each other, (2) transferring the read signal in the first direction by 2(k−1)/k bits, (3) defining i=i+2, (4) repeating the steps (1) through (3) from a first pixel closest to the second charge transfer portion to a pixel farthest from the second charge transfer portion among the pixels arranged in the pixel portion, and (5) after time $t_a$ when the steps (1) through (3) are repeated up to an r-th pixel in the middle of the step (4), repeating the steps (1) through (3) from a first pixel closest to the second charge transfer portion to a pixel farthest from the second charge transfer portion among the pixels arranged in the pixel portion, wherein the steps (4) and (5) are simultaneously conducted after the time $t_a$, where k is an integer of 2 or more, r is an integer of 1 or more, and j=INT[{(i−1)/k}+1] (INT[ ] is an integer portion of [ ] (a fractional portion is discarded)).

* * * * *